US008057607B2

(12) United States Patent
Gardner et al.

(10) Patent No.: US 8,057,607 B2
(45) Date of Patent: Nov. 15, 2011

(54) AUTOMATED HEAT EXCHANGER TUBE CLEANING ASSEMBLY AND SYSTEM

(75) Inventors: John E. Gardner, Galveston, TX (US); Pedro E. Amador, Lawrenceville, GA (US); William Stamps Howard, Buford, GA (US); James A. Stoner, Lawrenceville, GA (US)

(73) Assignee: Aquilex Hydrochem, Inc., Deer Park, TX (US)

(*) Notice: Subject to any disclaimer, the term of this patent is extended or adjusted under 35 U.S.C. 154(b) by 243 days.

(21) Appl. No.: 12/383,183

(22) Filed: Mar. 20, 2009

(65) Prior Publication Data

US 2009/0255557 A1 Oct. 15, 2009

Related U.S. Application Data

(60) Provisional application No. 61/070,073, filed on Mar. 20, 2008.

(51) Int. Cl.
*B08B 9/027* (2006.01)
*G05D 1/00* (2006.01)

(52) U.S. Cl. .............. 134/56 R; 134/166 C; 134/166 R; 134/167 C; 134/168 C

(58) Field of Classification Search ................ 134/56 R, 134/166 C, 166 R, 167 C, 167 R, 168 C, 134/168 R
See application file for complete search history.

(56) References Cited

U.S. PATENT DOCUMENTS 3,269,659 A * 8/1966 Shelton et al. ................ 239/753
3,389,713 A * 6/1968 Pittman ..................... 134/167 R
4,095,305 A * 6/1978 Goodwin ................. 15/104.095
4,509,544 A * 4/1985 Mains, Jr. ...................... 134/144
4,716,611 A * 1/1988 Barry ............................. 15/3.51
5,065,703 A 11/1991 Lee
5,103,847 A * 4/1992 Martin et al. ................. 134/157
5,261,600 A * 11/1993 Cradeur ........................ 239/753
5,499,639 A * 3/1996 Williams, Jr. ..................... 134/7
5,555,851 A 9/1996 Vandenberg
5,561,883 A 10/1996 Landry et al.
5,640,982 A 6/1997 Landry et al.
5,642,745 A 7/1997 Landry et al.
5,740,821 A 4/1998 Arnold
6,681,839 B1 1/2004 Balzer
2004/0006841 A1 1/2004 Jameel (Continued)

FOREIGN PATENT DOCUMENTS

EP 0162309 11/1985

OTHER PUBLICATIONS

Powerpoint Presentation—HydroChem Capabilities Presentation—May 9, 2008.

(Continued)

*Primary Examiner* — Joseph L Perrin
*Assistant Examiner* — Benjamin Osterhout
(74) *Attorney, Agent, or Firm* — Greenberg, Traurig, LLP

(57) ABSTRACT

An automated heat exchanger tube cleaning assembly and system are provided. The present system can automatically (without ongoing human intervention) survey the tube sheet of a heat exchanger in three-dimensions, convert and record the survey results as a digital file in three-dimensions, and then, according to sequential parameters input via custom software, automatically coordinate via computer one or more cleaning devices to effect the cleaning of each desired tube of the heat exchanger.

21 Claims, 31 Drawing Sheets

U.S. PATENT DOCUMENTS

2006/0185691 A1* 8/2006 Joseph .......................... 134/22.1
2008/0185126 A1* 8/2008 Jiang et al. ...................... 165/95

OTHER PUBLICATIONS

Powerpoint Presentation—HydroChem STARS Project—Oct. 24, 2007.

Powerpoint Presentation—HydroChem Managed Services Presentation—May 8, 2008.

PCT/US2009/001764 Annex to Form PCT/ISA/206 Communication Relating to the Results of the Partial International Search.

TLE Machine—Mourik Magazine, No. 33—Jan. 2005—Joh. Mourik & Co. Holding B.V., P.O. Box 2, NL-2964 ZG Groot-Ammers.

URACA Heat Exchanger Cleaning Brochure—URACA Pumpenfabrik GmbH & Co. KG—Jan. 2000—Available on Internet website www.uraca.de.

* cited by examiner

AUTOMATED HEAT EXCHANGER TUBE CLEANING ASSEMBLY AND SYSTEM

RELATED APPLICATIONS

This application claims the benefit, and priority benefit, of U.S. Provisional Patent Application Ser. No. 61/070,073, filed Mar. 20, 2008, titled "Automated Heat Exchanger Tube Cleaning Assembly and System."

BACKGROUND

1. Field of Invention

This invention relates generally to the cleaning of heat exchangers, and more particularly, to an apparatus and system for removing residue which accumulates over time in heat exchangers and other tubing and piping used in industrial facilities.

2. Description of the Related Art

Heat exchangers are commonly used in industrial facilities. Over time, these heat exchangers tend to develop residue on the surfaces of the tubes, tube sheets, tube support plates and other internal structural parts. The residue can comprise adherent films, scales, sludge deposits, corrosion and/or other similar materials. Over time, this residue can have an adverse affect on the operational performance of the exchangers. The same problem can arise for all piping and tubing found in industrial facilities.

Various cleaning devices and methods have been developed to remove this residue buildup from heat exchangers, tubes and other piping. A common method involves the controlled application of high pressure water and/or chemical streams to the affected areas of the heat exchanger. This method can require the presence of one or more persons at or near the point of application of the high pressure stream to the exchanger during the cleaning process.

For example, an operator may stand in clear view of, and near the line-of-fire of, the high pressure stream to direct the stream to the affected areas of the exchanger. Another person may be needed to operate a control panel next to the exchanger to further control the direction and volume of stream flow. This type of work is extremely labor intensive and potentially hazardous. For example, it may be necessary for crews to manually reposition the device providing the high pressure stream for each cleaning stroke. Further, those persons in close proximity to the cleaning environment can be exposed to high pressure water, hazardous cleaning chemicals or other potentially toxic, poisonous or volatile materials.

SUMMARY OF THE INVENTION

In accordance with the illustrative embodiments hereinafter described, an automated heat exchanger tube cleaning assembly and system are provided. In an embodiment, the system can automatically (without ongoing human intervention) survey the tube sheet of a heat exchanger in three dimensions, convert and record the survey results as a digital file in three dimensions, and then, according to sequential parameters input via custom software, automatically coordinate via computer one or more cleaning devices such as lances to effect the cleaning of each desired tube of the heat exchanger.

In an illustrative embodiment, a system for cleaning tubes in a heat exchanger may include a scanning device for capturing three dimensional coordinates corresponding to the location of the tubes in the heat exchanger to be cleaned, a heat exchanger tube cleaning lance, a heat exchanger tube cleaning lance positioning device, and a motion control computer for controlling the motion of the heat exchanger tube cleaning lance positioning device with respect to the tubes in the heat exchanger based upon the three dimensional coordinates captured by the laser surface scanning device. In an illustrative embodiment, the scanning device can be a sensor. Further, the sensor can be, for example, a laser.

A command console may be in operational connection with the motion control computer for controlling the motion of the heat exchanger tube cleaning lance positioning device from a remote location. The system may function as a completely automated system or a remote controlled system, as desired. A pumping station may supply cleaning materials (including, but not limited to, high-pressure water to approximately 50,000 PSI) to the heat exchanger tube cleaning lance. The respective structures and movements of the heat exchanger tube cleaning lance and the laser surface scanning device may be independent of each other.

In another illustrative embodiment, a method of cleaning one or more tubes in a heat exchanger is provided. The method can include, for example, the steps of digitally surveying the heat exchanger tube sheet in three dimensions to determine the location of the heat exchanger tubes, positioning a tube cleaning device adjacent to the heat exchanger tube sheet, and aligning the tube cleaning device with the heat exchanger tubes based upon the tube locations determined by the digital survey. The survey results obtained from the digital survey may be stored in a motion control computer. Each of the steps of digitally surveying, positioning, and aligning may be controlled by a motion control computer. Further, the location of the motion control computer may be remote from the location of the tube cleaning device.

In another illustrative embodiment, a recalibration system and related method are provided that allow for automatically recalibrating the position of a cleaning lance with respect to one or more heat exchanger targets. The computer motion controller may, in accordance with user-defined time intervals or as a result of a missed target, move the tip of the cleaning lance to a three dimensional coordinate value known by the computer to be the position of a recalibration sensor. The recalibration sensor may be temporarily rigidly fixed to the heat exchanger shell during identification of the initial three dimensional coordinate point having a specific coordinate value. This three dimensional coordinate value can be measured and delivered to the computer prior to starting the cleaning. When the lance tip is at the coordinate point, and assuming no shifting of the lance tip relative to the exchanger has occurred, the computer may receive an input signal from a sensor or set of sensors that have detected the lance tip and confirmed that it is in the proper location, such as, for example, through the use of thru-beam optical sensors, non-contact proximity sensors, contact proximity sensors, or digital imaging sensors. If the lance has shifted, then a different input signal can be received, and repositioning information may be obtained by the nature of the signal such that the computer may make the slight adjustment of the lance's position relative to the recalibration sensor, and then move to the 3-D point again to confirm recalibration has been successful. The computer controller may then move back to the next cleaning target and resume the cleaning operation.

In another illustrative embodiment, a system for cleaning one or more tubes on the tube sheet of a heat exchanger is provided. The system can include a display for presenting a map of at least a portion of the tube sheet, a user input device for defining a cleaning region on the map and for identifying at least one tube within the cleaning region, a tube cleaning lance for accessing one or more tubes on the tube sheet, a tube cleaning lance positioning device for maneuvering the tube cleaning lance, and a motion control computer for navigating the motion of one or more of the tube cleaning lance and the tube cleaning lance positioning device with respect to the tubes on the tube sheet by utilizing information received from the user input device.

The user input device can be one or more of a touch screen, a joystick controller, a mouse and a trackball. The tube cleaning lance can access the one or more tubes on the tube sheet in any order desired, for example, simultaneously or sequentially. The motion control computer can be communicatively coupled to a remote monitoring device via a communications network. The location of the motion control computer can be a remote distance from the location of the tube cleaning lance positioning device. A pumping station can be operationally controlled by the motion control computer for supplying cleaning materials to the tube cleaning lance.

In another illustrative embodiment, a method of maneuvering a heat exchanger tube cleaning device with respect to a tube sheet of a heat exchanger is provided. A map of at least a portion of the tube sheet can be provided. User input can be accepted regarding a plurality of reference points within the map, the plurality of reference points defining the location of a plurality of tubes to be cleaned on the tube sheet. The motion of the tube cleaning device can be navigated with respect to the plurality of reference points. The navigation may be manual or automatically controlled.

In another illustrative embodiment, a method of maneuvering a heat exchanger tube cleaning device with respect to a tube sheet of a heat exchanger is provided. A map of at least a portion of the tube sheet can be provided. User input can be accepted regarding a plurality of reference points within the map, the plurality of reference points defining the perimeter of a cleaning region with one or more tubes to be cleaned located therein. The motion of the tube cleaning device can be navigated with respect to the plurality of reference points and the one or more tubes located within the cleaning region. The navigation may be manual or automatically controlled.

In another illustrative embodiment, a method of cleaning one or more tubes on the tube sheet of a heat exchanger is provided. A tube cleaning device can be positioned adjacent to the tube sheet. A map can be provided of at least a portion of the tube sheet. User input can be accepted on a motion control computer regarding a plurality of reference points on the map, the plurality of reference points corresponding to a plurality of tubes on the tube sheet that define the perimeter of a cleaning region. The motion of the tube cleaning device can be navigated to the plurality of tubes on the tube sheet that define the perimeter of the cleaning region. The navigation may be manual or automatically controlled. The tube cleaning device can be instructed to clean the plurality of tubes on the tube sheet that define the perimeter of the cleaning region. The location of one or more tubes located within the cleaning region may be identified. The motion of the tube cleaning device can be navigated to the one or more tubes located within the cleaning region using the motion control computer. The tube cleaning device can be instructed to clean the one or more tubes located within the cleaning region. The motion of the tube cleaning device can be automatically navigated to the plurality of tubes on the tube sheet that define the perimeter of the cleaning region or to the one or more tubes located within the cleaning region using the motion control computer.

In another illustrative embodiment, a method of cleaning one or more tubes on the tube sheet of a heat exchanger is provided. A tube cleaning device can be positioned adjacent to the tube sheet. A map may be provided of at least a portion of the tube sheet. User input can be accepted on a motion control computer regarding a plurality of reference points on the map, the plurality of reference points corresponding to a plurality of tubes that define the perimeter of a cleaning region. The location of one or more tubes located within the cleaning region can be identified. The motion of the tube cleaning device can be navigated to the plurality of tubes that define the perimeter of a cleaning region and the one or more tubes located within the cleaning region using the motion control computer. The navigation may be manual or automatically controlled. The tube cleaning device can then be instructed to clean the tubes.

While certain preferred illustrative embodiments will be described herein, it will be understood that this description is not intended to limit the invention to those embodiments. On the contrary, it is intended to cover all alternatives, modifications, and equivalents, as may be included within the spirit and scope of the invention as defined by the appended claims.

DETAILED DESCRIPTION OF THE INVENTION

Figure 1:
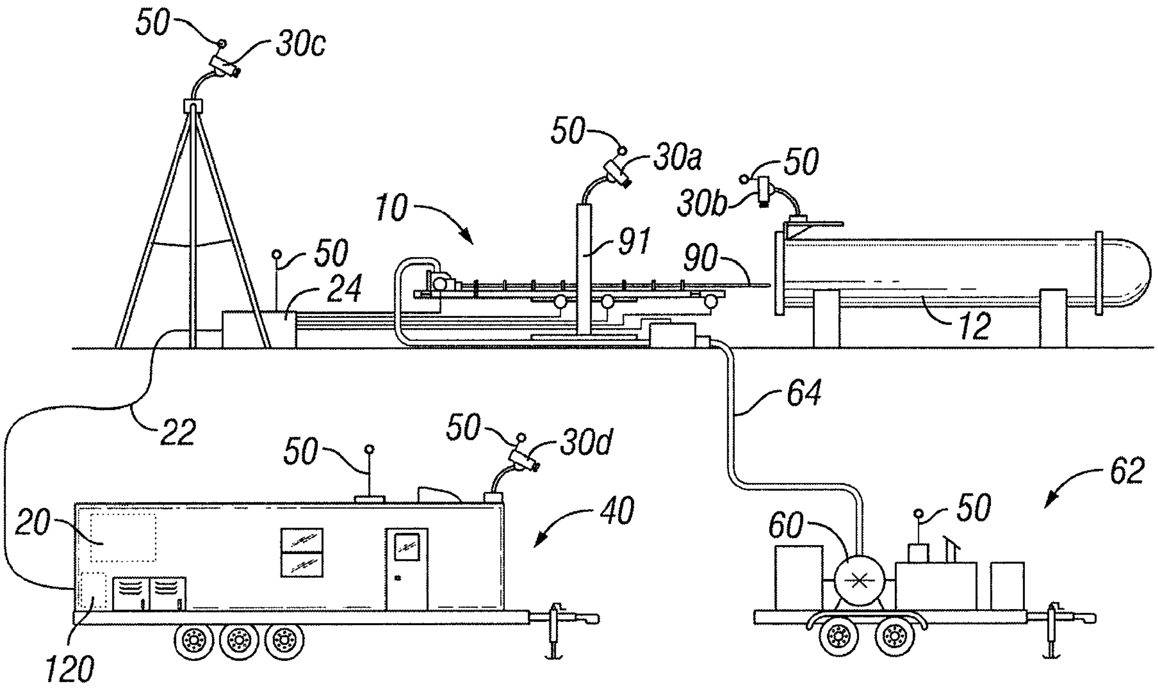
FIG. 1 is a schematic view of a heat exchanger tube cleaning assembly in an embodiment of an automated heat exchanger tube and industrial tube/pipe cleaning assembly and system.

Referring now to FIG. 1, an illustrative embodiment of an automated heat exchanger tube cleaning assembly 10 and related system is provided. Assembly 10 allows for automated tube lancing of a heat exchanger 12 or other piping or equipment used in an industrial facility such as, for example, a petrochemical plant or oil refinery. Assembly 10 is positioned adjacent exchanger 12 to be cleaned. Assembly 10 can facilitate the delivery of one or more streams of cleaning materials such as high-pressure water and/or chemicals to the inside of tubes 88 (see FIG. 4) inside exchanger 12. The pressurized cleaning stream removes residue build-up from the inside of these tubes 88 as well as other affected areas.

Figure 2:
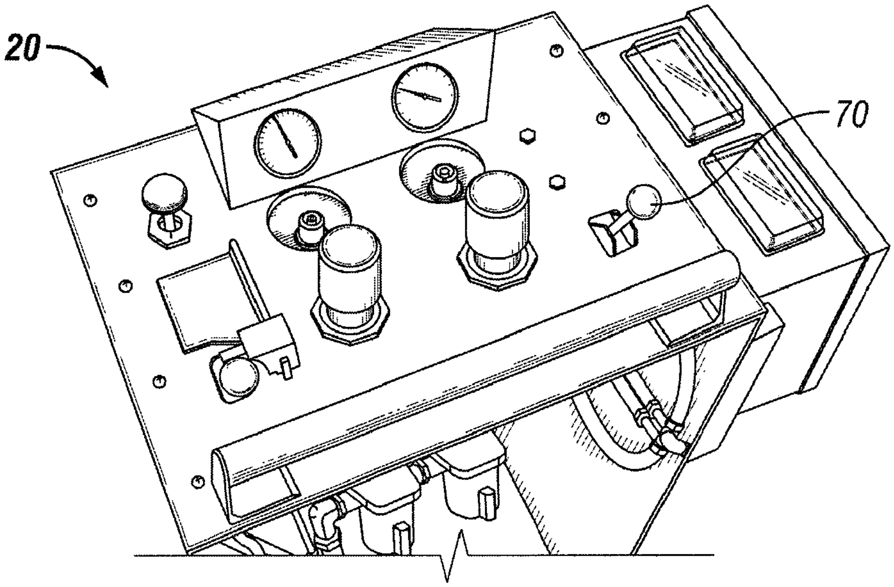
FIG. 2 is a perspective, schematic view of a control console for use in an embodiment of an automated heat exchanger tube and industrial tube/pipe cleaning assembly and system.

Operations of assembly 10 can be controlled by a control console 20, as illustrated in FIG. 2. In an illustrative embodiment, control console 20 is remotely located from assembly 10. For example, referring back to FIG. 1, control console 20 can communicate with assembly 10 via hardwiring, such as an umbilical cable 22. Cable 22 can connect control console 20 to assembly 10 via, for example, an assembly control module 24 adjacent to assembly 10. Alternatively, assembly 10 can communicate with control console 20 via a wireless communications network, which can take the form of radio signals, Internet or other similar communication forms. Control console 20 can allow for precision control by an operator of assembly 10 at a location that is remote, that is, physically distant, from the location of exchanger 12.

Figure 3:
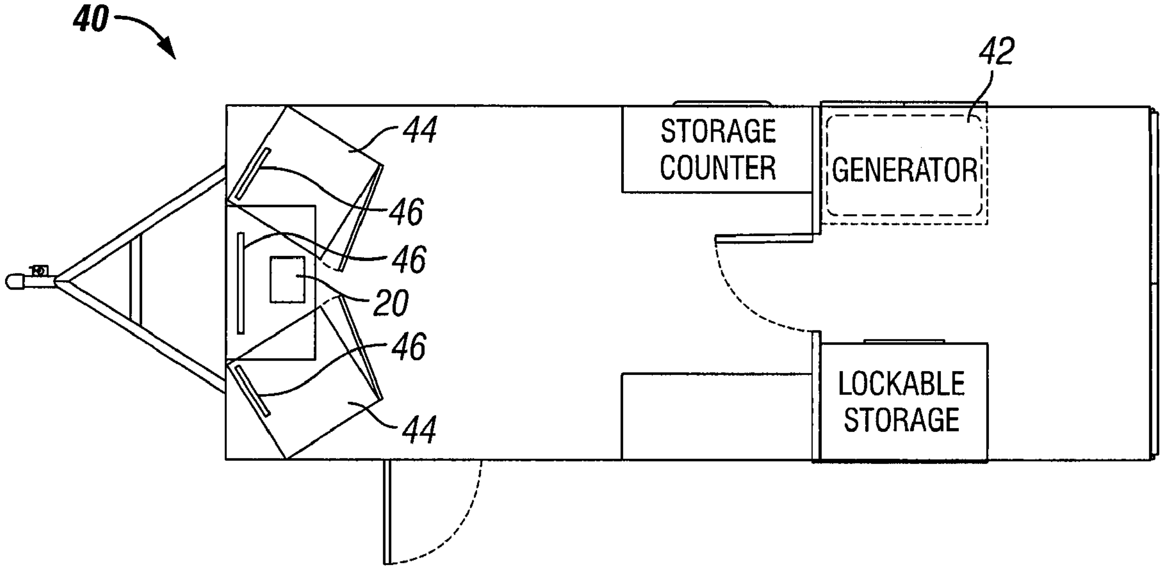
FIG. 3 is a schematic view of a command trailer for use in an embodiment of an automated heat exchanger tube and industrial tube/pipe cleaning assembly and system.

In a specific illustrative embodiment, control console 20 is located in a command trailer 40 (FIGS. 1 & 3). Alternatively, control console 20 may also be utilized in the absence of trailer 40. Command trailer 40 is preferably a safe, controlled environment and can include central heat and A/C. Command trailer 40 can also include its own power source 42 such as, for example, a built-in 7 KW generator with multiple GFCI outlets and 12-Volt regulated power supply in an illustrative embodiment. Trailer 40 can also be mobile so that it can be moved from location to location as desired.

Control console 20 can be integrated with a command station 44 within trailer 40. Command station 44 can include, in addition to control console 20, video monitor screens 46 and appropriate dials, switches and other instruments for controlling the operation of assembly 10 and its related features and components.

One or more video cameras 30 (FIG. 1) can be utilized so that, for example, video signals may be delivered to command station 44 and viewed on video monitor screens 46. Cameras 30 can provide clear, high-definition video capture and live feed to command station 44. Antennas 50 (FIG. 1) may be utilized to facilitate the delivery of communications between, for example, trailer 40 and the cameras 30 of assembly 10.

In an illustrative embodiment, a series of four cameras 30*a*, 30*b*, 30*c*, & 30*d* can feed images to command station 44. The cameras 30*a*, 30*b*, 30*c*, & 30*d* preferably have full remote-control pan, tilt, and zoom as well as near-infrared capability and completely waterproof enclosures. Two cameras 30*a*, 30*b* can display the work at the exchanger tube sheet in close-up detail to, for example, allow a process operator to safely watch the work as it occurs and/or to guide him in real time if he elects to control the cleaning process from a remote location. Third camera 30*c* can display the entire exchanger 12 and assembly 10. Fourth camera 30*d* can be positioned atop command trailer 40 to display the area around a pump 60 and trailer 62. Pump 60 disposed on trailer 62 supplies pressurized cleaning materials to assembly 10 via tubing 64. Cameras 30*a*, 30*b*, 30*c* and 30*d* can be moved or repositioned as necessary to obtain the desired view of the system.

In an illustrative embodiment, a pan and tilt joystick controller 70 (FIG. 2) can be used to control the various directional movements of components of assembly 10, for example, one or more cleaning lances 90 (FIG. 1) for cleaning the tubes of exchanger 12. Joystick controller 70 can comprise, for example, any recognized user input device such as a touch screen, a joystick controller, a mouse or a trackball, and would be in accordance with the present illustrative embodiments. Controller 70 can be located on control console 20 if desired. Controller 70 or a similar controller can also be used to move video cameras 30*a*, 30*b*, 30*c*, & 30*d* about their vertical and longitudinal axes, thereby enlarging the field of view. Cameras 30*a*, 30*b*, 30*c*, & 30*d* can also utilize zoom lens controllers in order to adjust the magnification factor such that assembly 10 and exchanger 12 may be monitored at whatever magnification is desired. Lens washer systems for the lenses of cameras 30*a*, 30*b*, 30*c*, and 30*d* may also be provided, which can direct a cleaning media across these lenses to wash away any accumulation of debris from the camera lenses.

Figure 4:
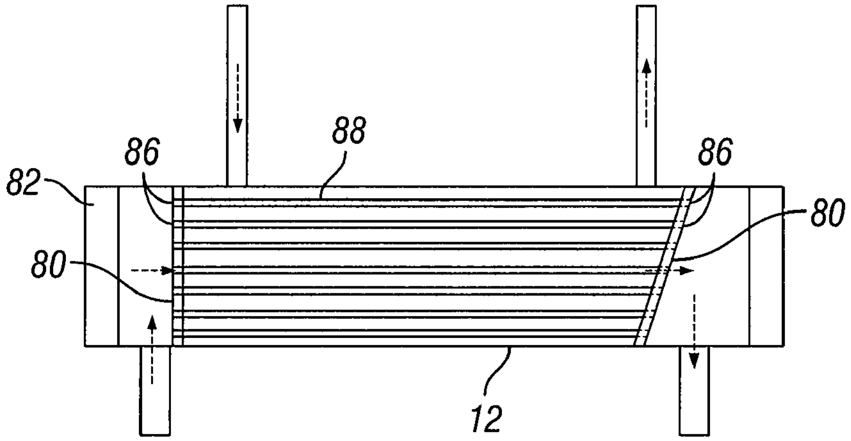
FIG. 4 is a cross sectional view of a heat exchanger showing the tubes running through the exchanger and terminating at each end in a tube sheet.
Figure 5:
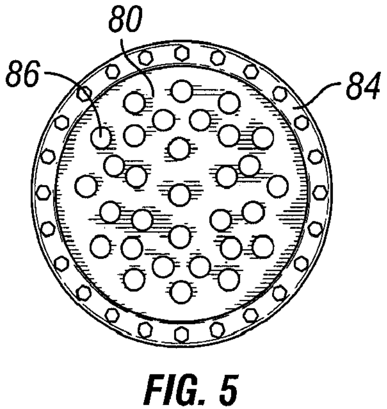
FIG. 5 is an end plan view of a tube sheet showing the exchanger head flange and an open end of each of the tubes in the exchanger of FIG. 4.
Figure 6:
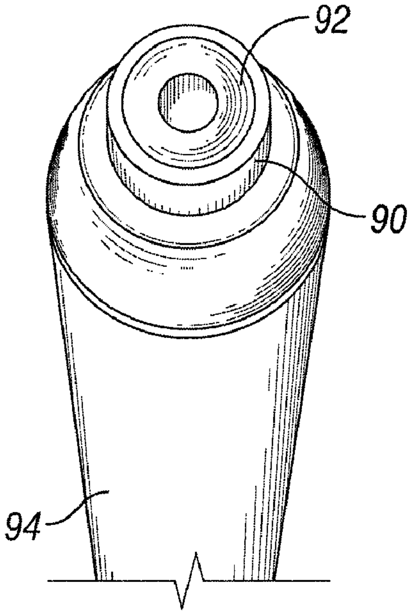
FIGS. 6-10 are perspective views of a cleaning lance and related components in an embodiment of an automated heat exchanger tube and industrial tube/pipe cleaning assembly and system.
Figure 7:
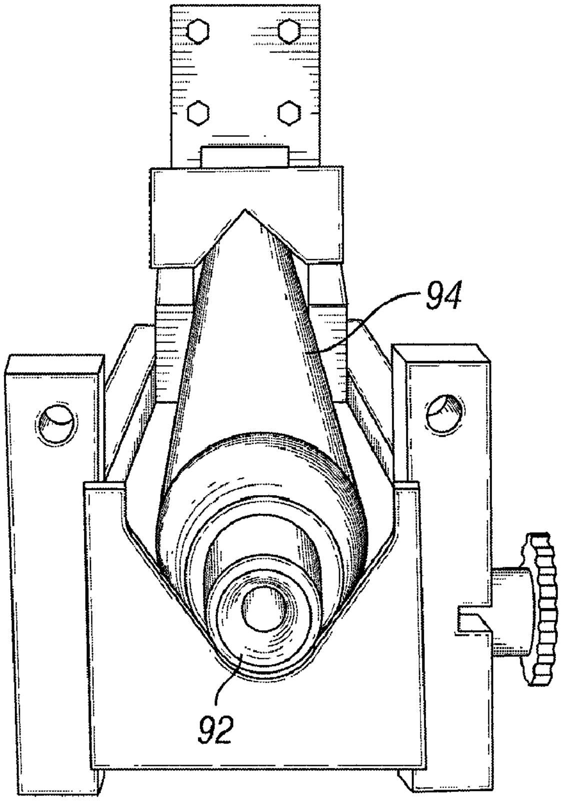
Figure 8:
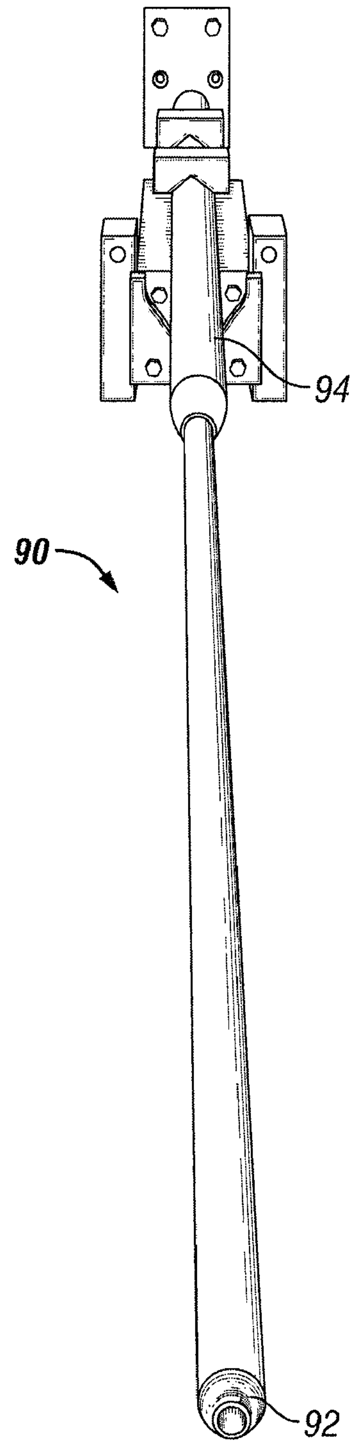
Figure 9:
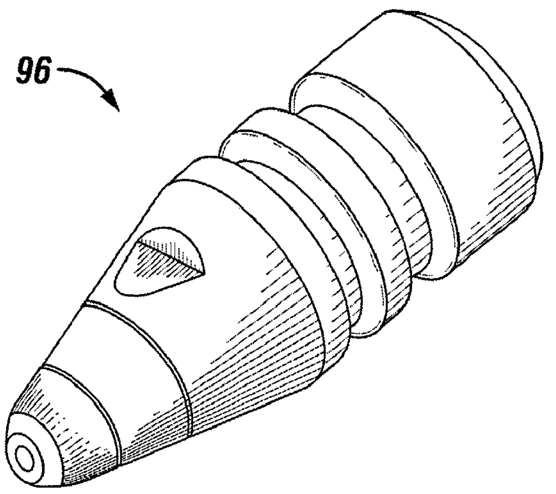
Figure 10A:
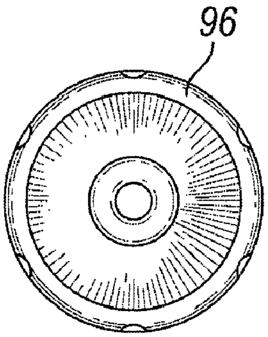
Figure 10B:
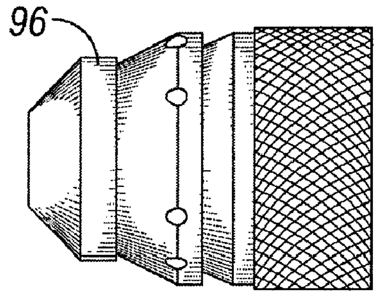

FIGS. 4 and 5 show an illustrative embodiment of heat exchanger 12. Exchanger 12 can have one or more tube sheets 80 accessible by removing an exchanger head 82 connected to a heat exchanger head flange 84. Each tube sheet 80 can have an open end 86 which exposes a plurality of tubes 88 having flow passageways in exchanger 12. Residue can accumulate in or near, among other areas, the flow passageways of tubes 88.

FIGS. 6-10 show illustrative embodiments of cleaning lance 90 and related components associated with assembly 10. It is recognized, however, that other cleaning instruments can also be utilized and would be in accordance with the present illustrative embodiments. Lance 90 can emit high pressure cleaning materials and can be rigid, semi-rigid or flexible as desired. Lance 90 can include a plurality of nozzles 96 on its outer surface through which cleaning materials are emitted. Further, lance 90 can rotate within tube 88 to allow for better distribution of cleaning materials. A tip end 92 of cleaning lance 90 (as shown in FIGS. 6-10) may be inserted into and through each of tubes 88 of exchanger 12 by passing tip end 92 of cleaning lance 90 through open ends 86 of tubes 88 provided on tube sheet 80. Nozzles 96 can be located on tip end 92 in an illustrative embodiment.

A guide tube 94 (FIGS. 6-8) can guide and control cleaning lance 90 as it extends into and through each of tubes 88. In an illustrative embodiment, guide tube 94 can be shaped like a gun barrel. There is preferably a tight tolerance between cleaning lance 90 and the inside walls of guide tube 94 to restrict unnecessary movement and promote efficient cleaning.

Control panel 20 can be used to regulate the movement of cleaning lance 90. For example, control panel 20 can control the distance that cleaning lance 90 extends out of, or retracts into, guide tube 94, or the rotational speed of lance 90 within tube 88. Also, control panel 20 can independently control the movement of one or more of guide tube 94, cleaning lance 90 and/or assembly 10. Also, control panel 20 can include indicators for lance revolutions per minute (RPM) and feet per second (FPS), as well as closed-loop feedback control circuit for positioning assembly 10. These types of indicators can allow for semi-automated control of motion parameters for lance 90 via, for example, programmable set-points for minimum and maximum allowable lance speed (linear and angular) and position.

Control panel 20 can also be used to regulate the operations of pump 60, or any other pumps utilized in connection with assembly 10. For example, an operator may start and stop pump 60 and have access to information regarding pump operations via control panel 20.

Figure 11:
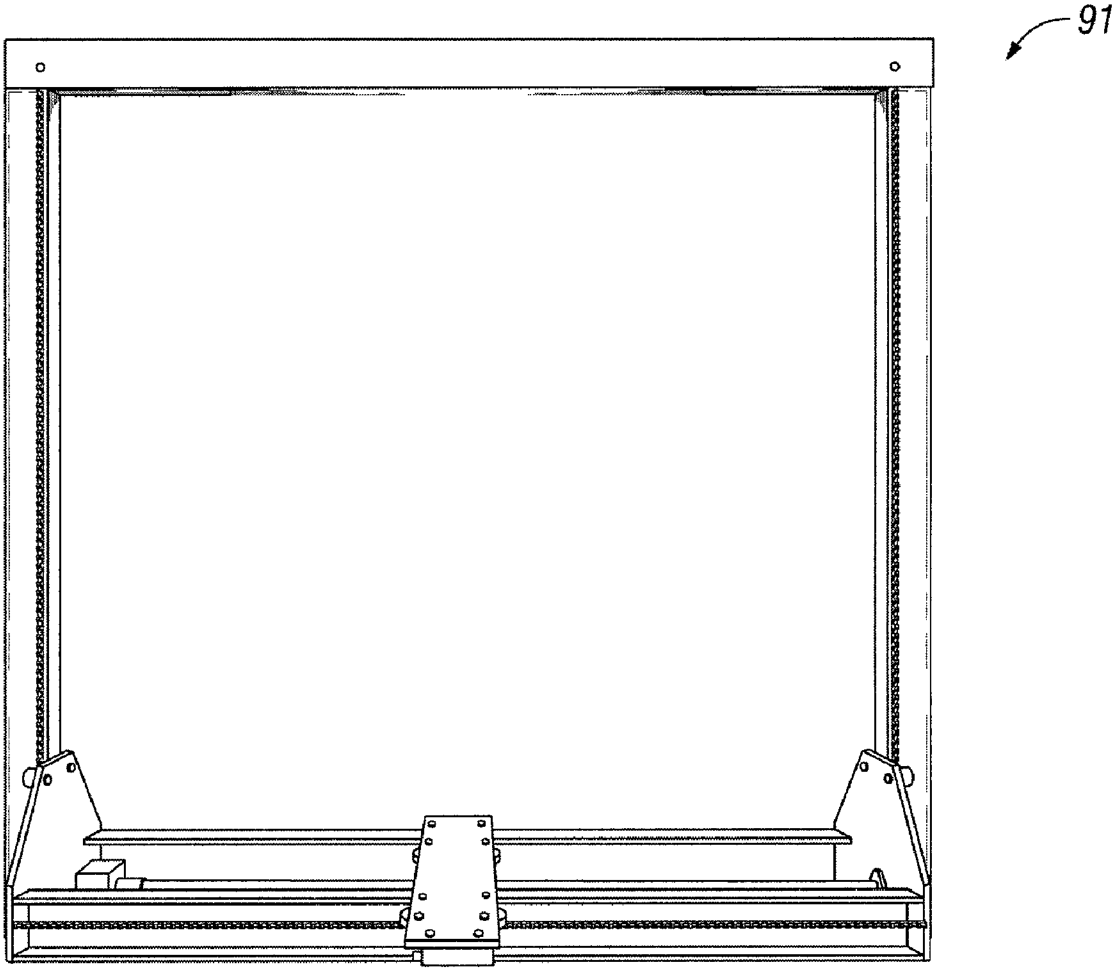
FIGS. 11 & 12 are perspective views of a cleaning lance positioning device in an embodiment of an automated heat exchanger tube and industrial tube/pipe cleaning assembly and system.
Figure 12:
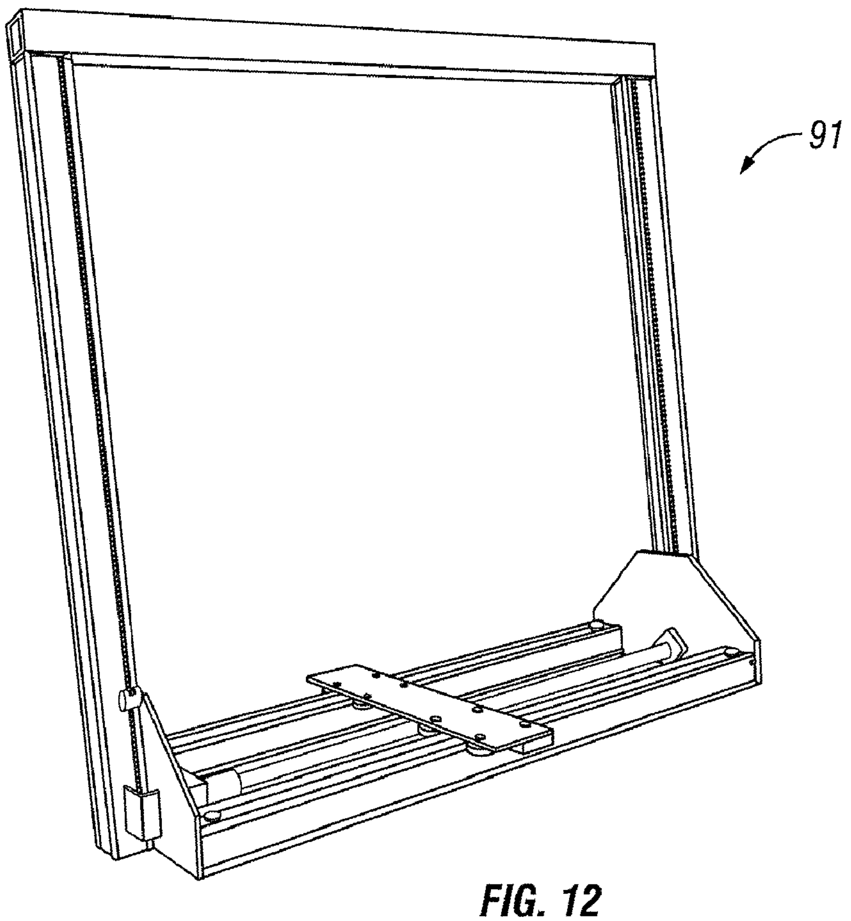
Figure 13:
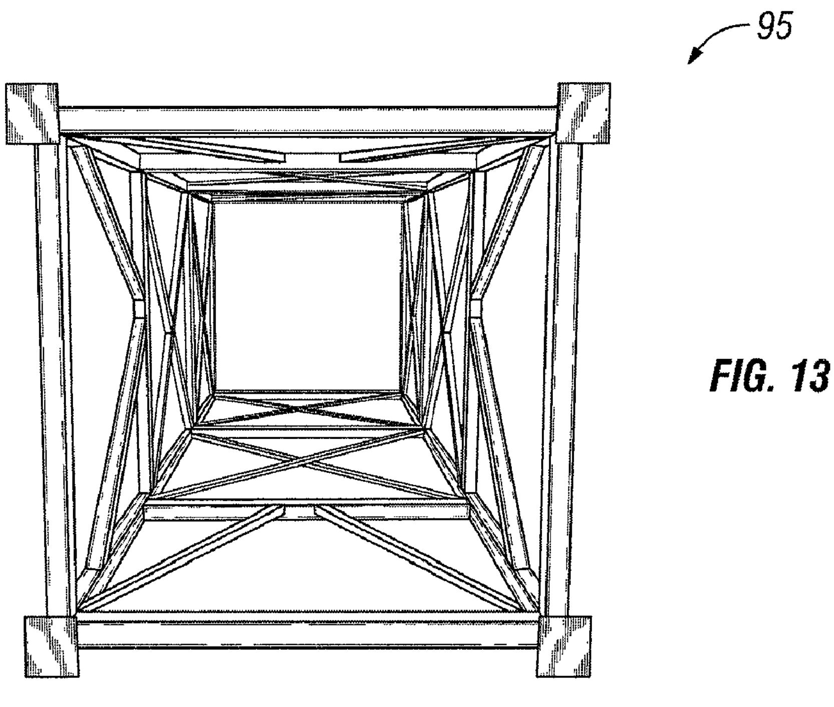
FIGS. 13 & 14 are perspective views of a frame for the cleaning lance positioning device of FIGS. 11 & 12.
Figure 14:
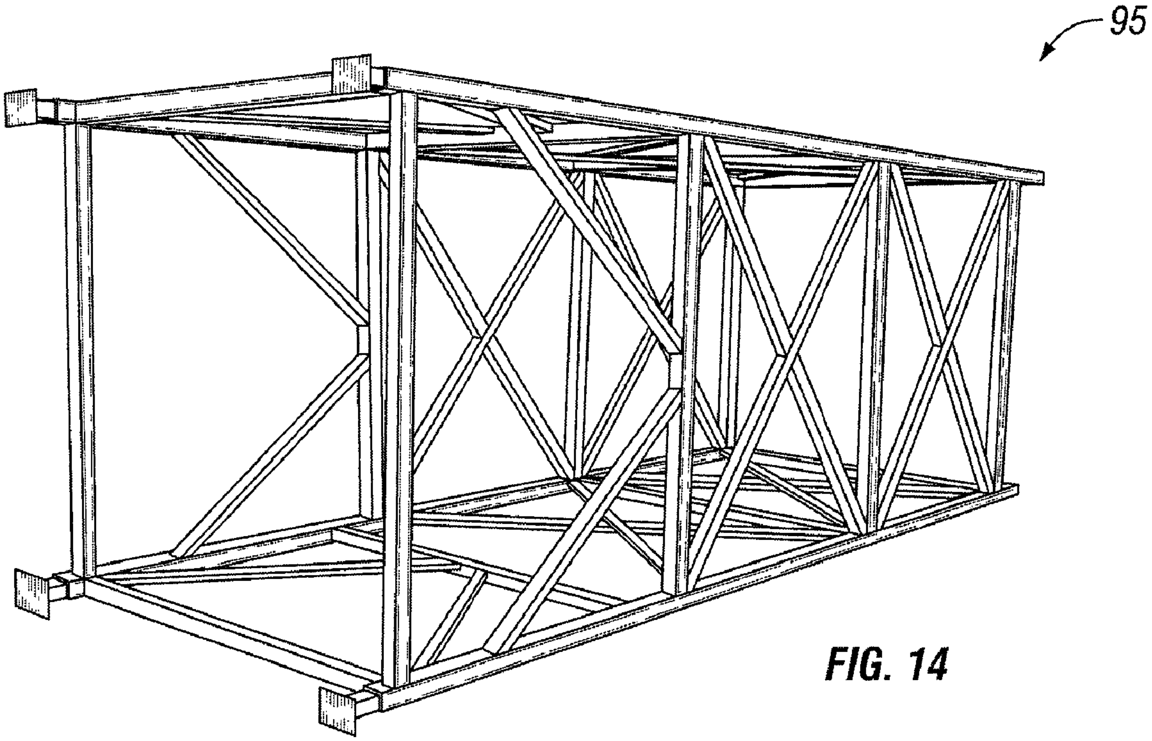

In an illustrative embodiment, cleaning lance 90 and guide tube 94 can be housed within a heat exchanger tube cleaning lance positioning device 91 (FIGS. 1 & 11-12) that can be part of assembly 10. Joystick controller 70 can also preferably control the movements of device 91. One or more of cleaning lance 90 and guide tube 94 can be manipulated and positioned for cleaning each tube 88 of exchanger 12 by using heat exchanger tube cleaning lance positioning device 99. Device 91 can be any device that is integrated with assembly 10 and can be used to control and maneuver the movements of one or more of lance 90 and guide tube 94 and fall within the present illustrative embodiments. Assembly 10 can be disposed within a frame 95, if desired (FIGS. 13-14). Frame 95 is preferably utilized to connect assembly 10 to exchanger 12, such that cleaning lance positioning device 91 will have little or no movement relative to exchanger 12 and guide tube 94 is rigid with respect to exchanger 12. In an illustrative embodiment, heat exchanger tube cleaning lance positioning device 91 is positioned on a solid stand and can have an adaptable universal bracket kit (not shown) that allows it to be fixed to nearly any type of exchanger, even vertical reboilers, with no scaffolding required. Heat exchanger tube cleaning lance positioning device 91 can also be positioned on wheels, if desired, so long as the wheels do not substantially affect movement of device 91 with respect to exchanger 12 during cleaning.

Figure 15:
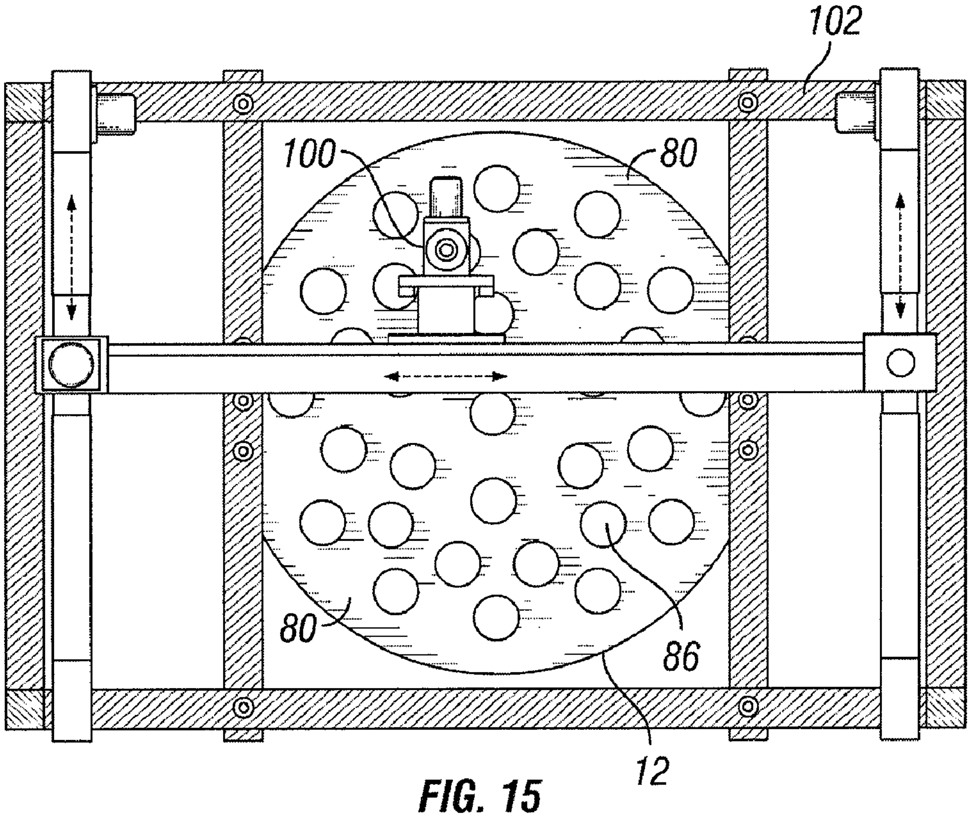
FIG. 15 is an end plan view of a scanning device in an embodiment of an automated heat exchanger tube and industrial tube/pipe cleaning assembly and system.

As illustrated in FIG. 15, an independent laser (or other sensor) surface scanning device 100 can be utilized to determine three dimensional ("3-D") coordinate targets and create a full resolution digital map of head flange 84, tube sheet 80, tubes 88 and tube open ends 86 of heat exchanger 12. In an illustrative embodiment, a scanning device 100 similar in construction to the MicroScribe digitizer and RSI 3D laser system provided by Immersion Corporation of San Jose, Calif. can be utilized. Scanning device 100 can move in three dimensions while controlled solely via motion control computer 120. For example, device 100 can measure the distance between the end of guide tube 94 and tube sheet 80 of exchanger 12 as a z-axis measurement. Three-dimensional coordinate mapping can allow for inclusion of precise digital data from the x, y and z coordinates, which eliminates errors which can result from roll, pitch, skew or yaw measured in two-dimensional environments only.

In an illustrative embodiment, scanning device 100 can be mounted upon tube sheet 80 of exchanger 12 using scanning mount 102 (FIG. 15). Scanning mount is preferably not attached to assembly 10, positioning device 91 and/or cleaning lance 90, so that the respective movements of scanning device 100 and cleaning lance 90 are independent of each other. Thus, scanning device 100 can be removed from exchanger 12 after scanning has occurred but prior to cleaning of the exchanger, to prevent flying debris from damaging scanning device 100.

Tube sheets 80 can be optically scanned by scanning device 100, and the scanned images can be delivered to motion control computer 120 (FIG. 1) affiliated with control console 20 and command station 44 prior to beginning cleaning. The position of scanning device 100 and the position of tubes 88 can be synchronized for computer numerically controlled (CNC) operation. Then the operator can switch between joystick controller 70 or complete automation as desired.

In an illustrative embodiment (see FIG. 15), scanning device 100 may scan one or more images of tube sheet 80 and open ends 86 of tubes 88 to be cleaned. The scanned images can be sent to control console 20 and stored in motion control computer 120. Motion control computer 120 can inspect and analyze the scanned images and identify each open end 86 and each associated flow passageway of each tube 88 in exchanger 12. Motion control computer 120 may then calculate the precise relative x-y-z coordinates of the center of each tube 88 at its plane of intersection with tube sheet 80. These initial coordinates can be stored to file for the particular exchanger 12. In an illustrative embodiment, no future scans are required.

Figure 16A:
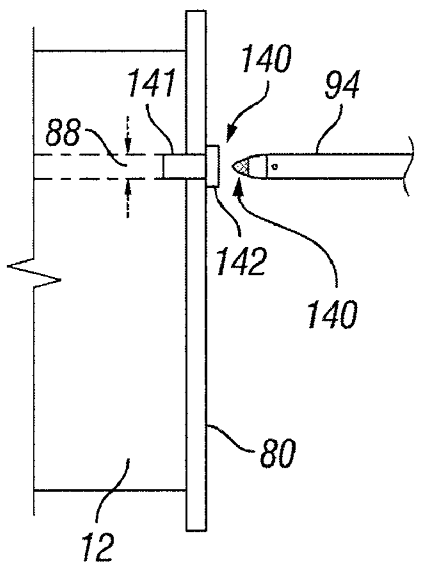
FIGS. 16 A, B & C are side and end plan views of a centering jig for a cleaning lance in an embodiment of an automated heat exchanger tube and industrial tube/pipe cleaning assembly and system.
Figure 16B:
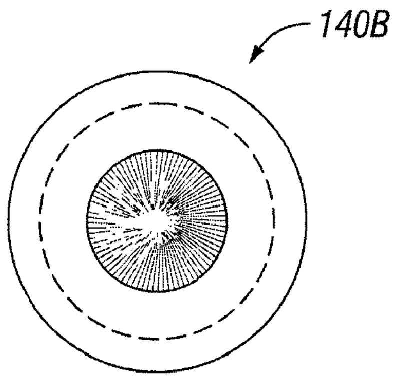
Figure 16C:
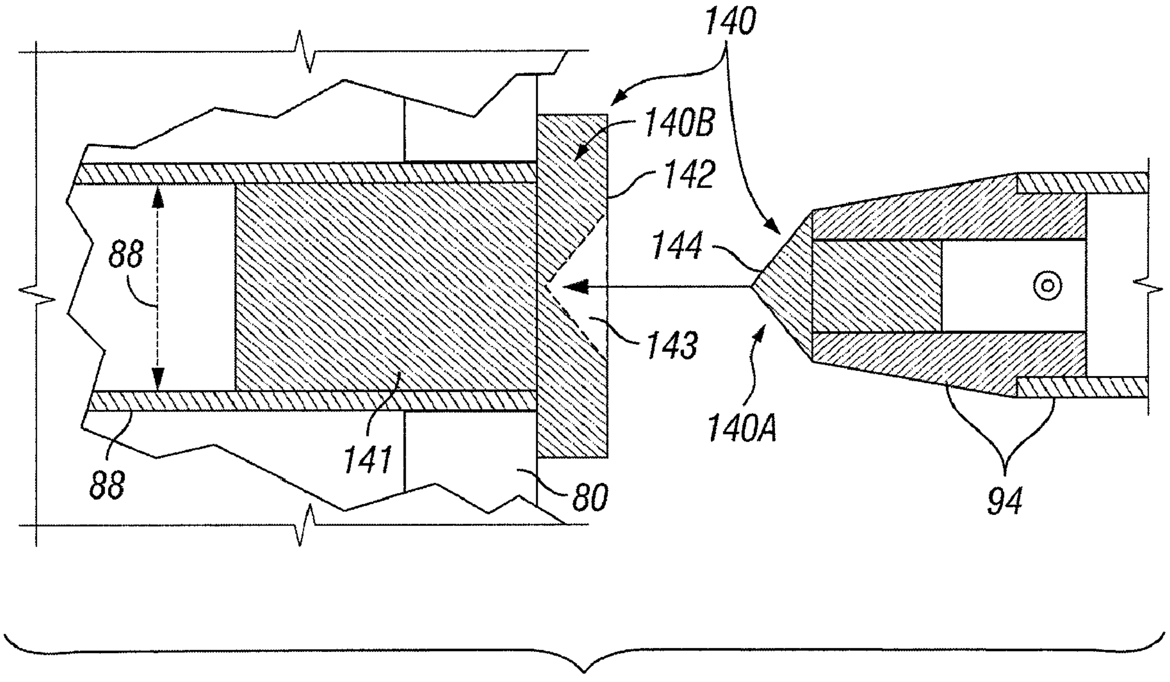

After the initial scan has occurred, a centering jig 140 (as shown in FIGS. 16 *a, b* & *c*) can be utilized to position guide tube 94 adjacent to exchanger 12 and stabilize guide tube 94 relative to tube sheet 80. In a preferred illustrative embodiment, centering jig 140 can comprise a cone-tip 140-A and a tube insert 140-B. Cone tip 140-A and tube insert 140-B can each be formed of polyethylene plastic in a specific embodiment. A back end 141 of tube insert 140-B can snap into the barrel of tube 88, while a front end 142 of tube insert 140-B may be exposed and can have a female cone 143 formed therein. Female cone 143 can receive a male point 144 of cone-tip 140-A. When male point 144 is disposed within female cone 143, guide tube 94 is sufficiently adjacent to exchanger 12 and stabilized relative to tube sheet 80. The size of tube insert 140-B can depend upon the diameter of tube 88 within which insert 140-B is positioned.

Joystick controller 70 can be utilized to position tip end 92 of cleaning lance 90 at the center of a minimum of three unique targets at the surface of tube sheet 80. Motion control computer 120 can determine the orientation of jig 140 relative to the previously stored x-y-z coordinates and calculate the most desirable location for cleaning lance 90.

Scanning device 100 (See FIG. 15) can be recalibrated or realigned on a continuous basis, to adjust for any changes relative to the initial coordinates calculated at the beginning of the cleaning process. These possible changes can be a result of, for example, shifting of assembly 10 or its components relative to exchanger 12. Either non-contact or contact type position indicating feedback sensors can be utilized during recalibration to guide the computer motion controller.

Figure 17:
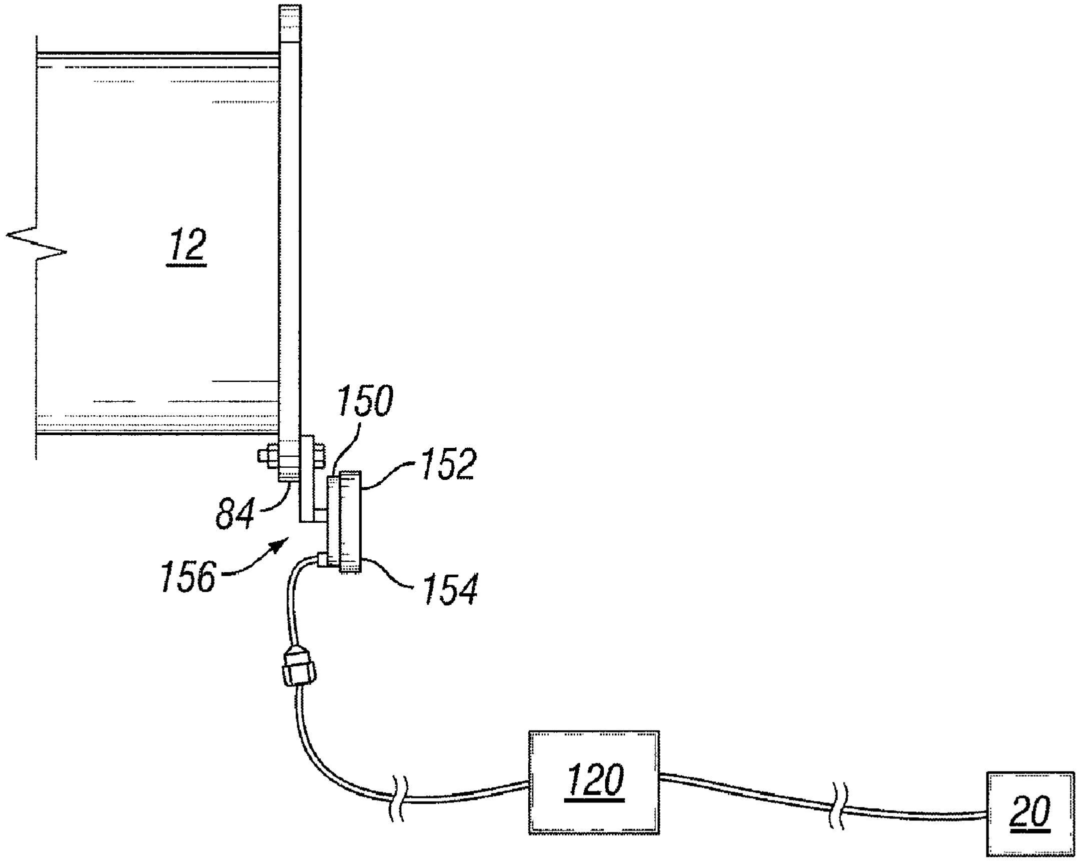
FIG. 17 is a side view of a recalibration system in an embodiment of an automated heat exchanger tube and industrial tube/pipe cleaning assembly and system.

In an illustrative embodiment, a recalibration disc 150 as shown in FIG. 17 can be utilized to recalibrate the system. Disc 150 can be attached to head flange 84 of exchanger 12. Recalibration disc 150 can comprise a solid disc of thermosetting polymer encasing a plurality of parallel, insulated, color-coded copper wires. The direction of the wires can be perpendicular to the plane formed by the flat surface of recalibration disc 150.

The front face of recalibration disc 150 can be sanded flat until the conductor of each wire in recalibration disc 150 is exposed as a conductive point on the flat plane. The wires can extend out of recalibration disc 150 on the backside and be chemically soldered into one half of a multi-conductor electronics plug. Recalibration disc 150 can then be silicone-bedded into a corresponding stainless steel cup, with the contact plane facing the open side and the connector plug protruding from the back. A removable snap-on face plate 152 can cover the contact side of recalibration disc 150.

In an illustrative embodiment, face plate 152 can have a plurality of small, spring loaded stainless steel pins 154 installed individually from the inside thereof. When face plate 152 is in place, an individual pin 154 can be positioned over each contact wire, and in the normal position the spring tension preferably does not allow pin 154 and the contact wire to touch. If a positive external force is applied to the outer surface of plate 152 and parallel to the wires in the bundle, the particular stainless pins 154 under the load can slide down and make contact with the wires under them.

As illustrated in FIG. 17, recalibration disc 150 can be bolted via a bracket 156 to exchanger 12 in a position which allows recalibration disc 150 to reach exchanger 12 through x-y-z movement. The multi-pin plug can be connected to the input/output field bus at the control console 20, and signals (such as low-voltage on/off, or yes/no circuit completion inputs) from recalibration disc 150 can be interpreted by the motion control computer 120 and compared to expected values to determine position and to adjust motion output accordingly.

Figure 18:
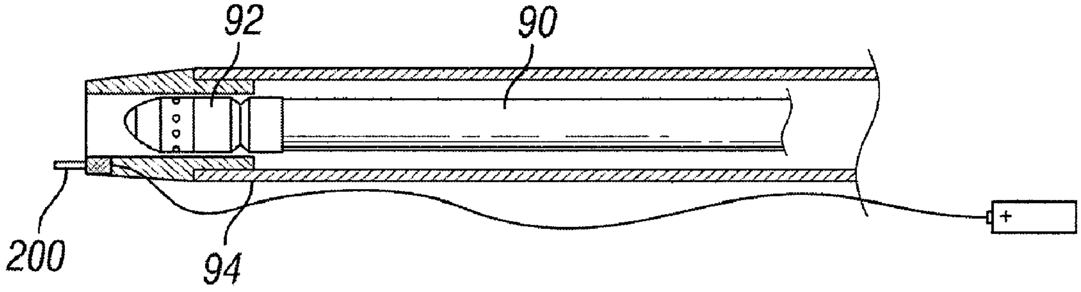
FIG. 18 is a side view of a positive polarity probe in an embodiment of an automated heat exchanger tube and industrial tube/pipe cleaning assembly and system.

As illustrated in FIG. 18, a positive polarity probe 200 can be rigidly fixed to the end of guide tube 94. Probe 200 can guide and control cleaning lance 90 as it is being positioned from target to target on exchanger 12. Probe 200 may be constantly energized via, for example, a lithium ion battery pack. In an illustrative embodiment, cleaning lance 90 can be formed of rigid stainless steel tubing and can move in and out through guide tube 94 with a critical tolerance that prevents backlash between lance 90 and guide tube 94, either repetitive and predictable or intermittent and unpredictable, that could compromise accuracy and/or precision of movement.

Upon initial set-up and after scanning device 100 has gathered its three dimensional coordinates and determined its current positioning relative to those coordinates, assembly 10 can be instructed by motion control computer 120 to begin an initial calibration procedure. Cleaning lance 90 can then be manually guided via control console 20 until positive polarity probe 200 on guide tube 94 makes contact with the center conductor pin 154 of recalibration disc 150. This contact can trigger motion control computer 120 to recall the x-y-z coordinates for this point, and recognize that these coordinates should always result in an input signal from the center wire. Scanning device 100 can periodically re-check the coordinates to confirm the signal.

If positive polarity probe 200 on guide tube 94 does not make contact with the center conductor pin 154 of recalibration disc 150, it can contact one or more of several hundred other pins resulting in a different input. At this point, motion control computer 120 can recognize exactly where positive polarity probe 200 is located relative to center conductor pin 154 due to the known geometry of the conductor spacing, and can deliver an appropriate output to the x-y-z motion system (the servomotors that control all motion) to attempt to hit center conductor pin 154 only. Motion control computer 120 can continue this trial-and-error loop until it once again finds center conductor pin 154, and may then realign the 3-D coordinate system with an updated spatial orientation. This recalibration procedure can occur at user-defined intervals and/or anytime a torque spike is encountered near the plane of tube sheet 80. In an illustrative embodiment, the process can take less than ten seconds in practice, as machine movement can exceed five g's acceleration and five meters per second velocity. Once recalibration is complete, motion control computer 120 can once again find the precise center of each target every time.

In an illustrative embodiment, a method of cleaning tubes in a heat exchanger is also provided. The method can include, for example, the steps of digitally surveying the heat exchanger tube sheet in three dimensions to determine the location of the heat exchanger tubes, positioning a tube cleaning device adjacent to the heat exchanger tube sheet, and aligning the tube cleaning device with the heat exchanger tubes based upon the tube locations determined by the digital survey. In an illustrative embodiment, a possible additional feature may include storing the survey results obtained from the digital survey in a motion control computer. Another possible additional feature may include each of the steps of digitally surveying, positioning and aligning being controlled by a motion control computer.

In an illustrative embodiment, a system for cleaning tubes in a shell and tube heat exchanger is provided. The system can include a laser surface scanning device 100 for capturing three dimensional coordinates corresponding to the location of the tubes 88 in the heat exchanger 12 to be cleaned, a heat exchanger tube cleaning lance 90, a heat exchanger tube cleaning lance positioning device 91, and a motion control computer 120 for controlling the motion of the heat exchanger tube cleaning lance positioning device 91 with respect to the tubes 88 in the heat exchanger 12 based upon the three dimensional coordinates captured by the laser surface scanning device 100.

In an illustrative embodiment, the system can recognize any potential collisions with personnel or equipment during the motion sequence and reverse direction before any injuries to personnel or damage to equipment occur. The servomotors can automatically and constantly relay torque information to the motion control computer 120, and the motion control computer 120 can use this information in accordance with how it is programmed by the user.

In the event of a torque spike in the z-axis during cleaning due to a plug in a tube target, the system can be programmed to, for example, abandon the tube target and move to the next tube target, or alternatively, withdraw cleaning lance 90 slightly and enable the high-pressure jets to cut away the plug within the tube target for a user defined time period, then try again to pass through the plugged area. This process can be repeated until the target area is clean or until a user defined number of attempts have been tried unsuccessfully. The system can also allow for the jet pressure to be raised to a user defined maximum as required to successfully cut through difficult areas.

The system can integrate function, control, and vital signs for pump 60 and the related high pressure jets of cleaning lance 90 with motion control computer 120. The system can allow for complete control of all pump functions, including engine start/stop, engage/disengage power take off ("PTO"), water supply valve on/off, raise/lower pressure, and high-pressure by-pass on/off. The system can also allow a user to monitor and adjust pump vitals such as water temperature, oil pressure, and voltage. This integration of pump 60 and the related high pressure jets of cleaning lance 90 with motion control computer 120 avoids the necessity for constant human interface at the location of the cleaning equipment and allows for a more efficient cleaning sequence.

In an illustrative embodiment, the system can be shut down or warnings can be initiated by motion control computer 120 if user defined thresholds are crossed. For example, the system can incorporate a safety light curtain as a safety barricade. The curtain can be multi-layered. If the curtain is encroached, the system may initiate an audible and visual alarm and/or shut down all high-pressure and motion, depending on what layer of intrusion has been encountered. In the case of a full breach with shutdown, a user with security credentials may then be required to declare the threat of injury passed and begin the restart procedure.

The system of the present invention can be operated continuously using shifts of operators to clean exchangers 12 quickly. Further, the system can incorporate networking and report generation capabilities. For example, assembly 10 can be linked to a local area network ("LAN") and/or a secure server via wireless Internet to provide customers and/or operators with information regarding the job being performed. In an illustrative embodiment, motion control computer 120 can be communicatively coupled to a remote monitoring device via a communications network. This information can include, for example, real-time job progress, estimated time of completion, estimated cost at completion, current cost, current percent complete, and average time per tube. The system can also auto-generate a post-job report upon completion, which provides details about all events and activities that took place at each cleaning site. For example, the report can include a visual map of exchanger 12 relating to z-axis torque profiles to demonstrate increased or decreased fouling by percent of total fouling. This information can help customers and/or operators to better understand which regions of exchanger 12 are subject to frequent or enhanced fouling and make process adjustments to enhance run times and efficiencies.

In an illustrative embodiment, the assembly and system of the present invention do not utilize scanning device 100. Instead, an operator can utilize motion control computer 120, control console 20, command station 44 and video cameras 30*a*, 30*b*, 30*c* & 30*d* to identify specific groups of tubes 88 on tube sheet 80 for cleaning. The operator can select these groups of tubes 88 by, for example, identifying specific sections or regions of tube sheet 80 containing these groups of tubes 88. The operator can then navigate the motion of one or more lances 90 to clean these groups of tubes 88.

Figure 19:
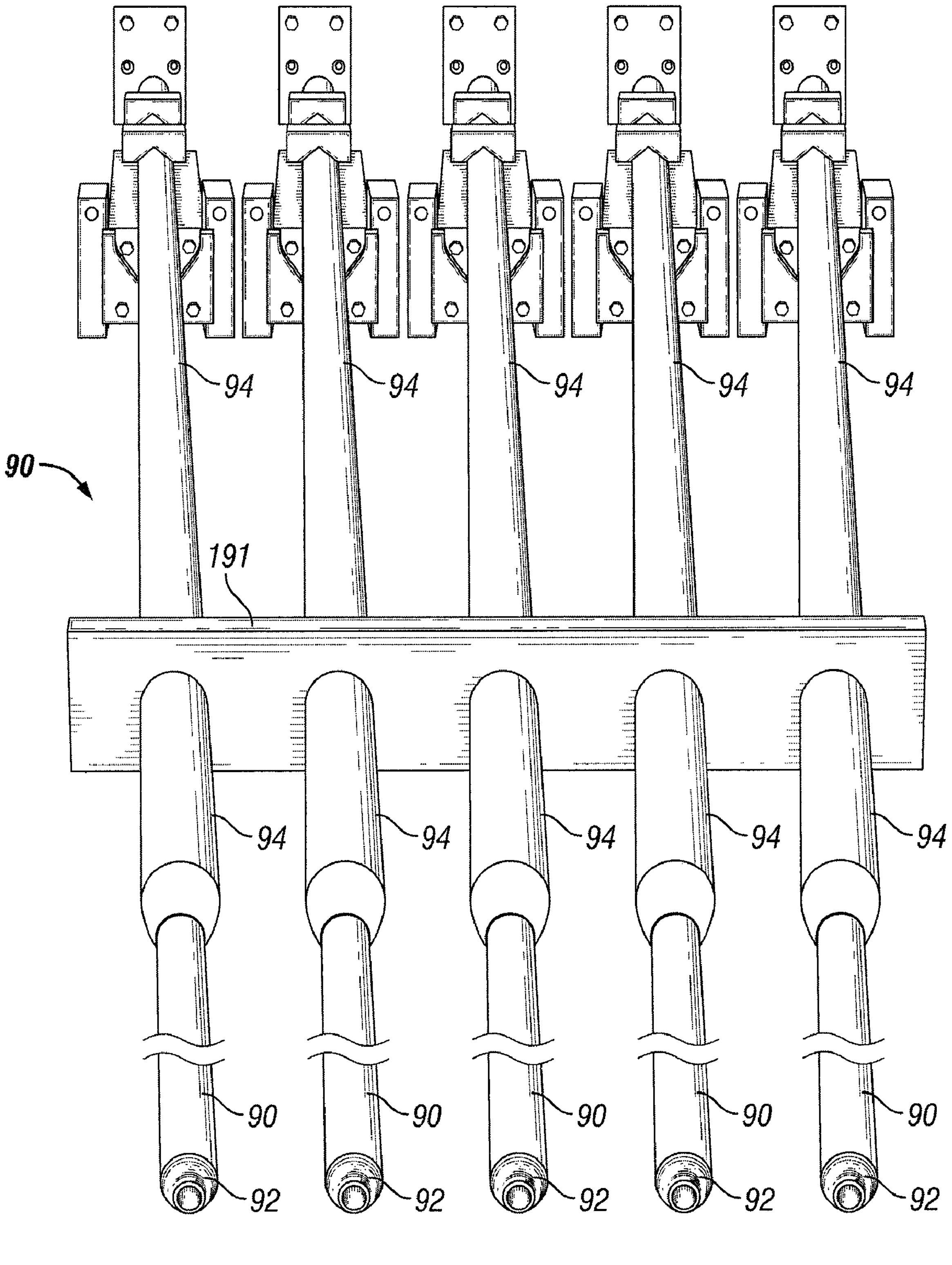
FIG. 19 is a perspective view of a plurality of cleaning lances and a bracelet in an embodiment of an automated heat exchanger tube and industrial tube/pipe cleaning assembly and system.

In an illustrative embodiment, five adjacent lances are utilized such as shown in FIG. 19. Alternatively, any combination of one or more lances 90 may be utilized as needed for efficient cleaning and would be in accordance with the present illustrative embodiments. Further, it is not required that lances 90 be aligned in parallel in every embodiment in which multiple lances 90 are utilized. Lances 90 may be staggered such that they form, for example, a triangular, rectangular or any other shaped pattern to correspond to the arrangement of multiple rows of tubes 88 on tube sheet 80. Also, one or more of lances 90 may be protruded or retracted during a cleaning stroke such that, for example, only three of five, or two of five, lances 90 actually enter tubes 88 during cleaning. Such protrusion or retraction can be accomplished manually or using control console 20 and motion control computer 120.

Lances 90 can be located within guide tubes 94. Lances 90 can be positioned such that their tip ends 92 align with the open ends 86 of the tubes 88 of exchanger 12. In an illustrative embodiment, the spacing between each lance 90 can be set manually using a bracelet 191 that slips over guide tubes 94 and/or lances 90. Alternately, spacing between lances 90 can be controlled and adjusted by motion control computer 120 without the use of bracelet 191. The size of bracelet 191 can be adjusted to correspond to the distance between the respective tubes 88 on tube sheet 80. When spaced properly, the adjacent lances 90 are preferably able to enter and clean the adjacent tubes 88 of exchanger 12.

During cleaning, assembly 10 can secure lances 90. Assembly 10 can be mounted to exchanger 12 via frame 95 or other mounting means to restrict movement. Alternatively, assembly 10 can be positioned adjacent to exchanger 12 without being mounted thereon, such that cleaning lances 90 and tubes 88 of exchanger 12 are generally on the same horizontal plane and lances 90 can travel in and out of the respective tubes 88 with minimal resistance.

Figure 20A:
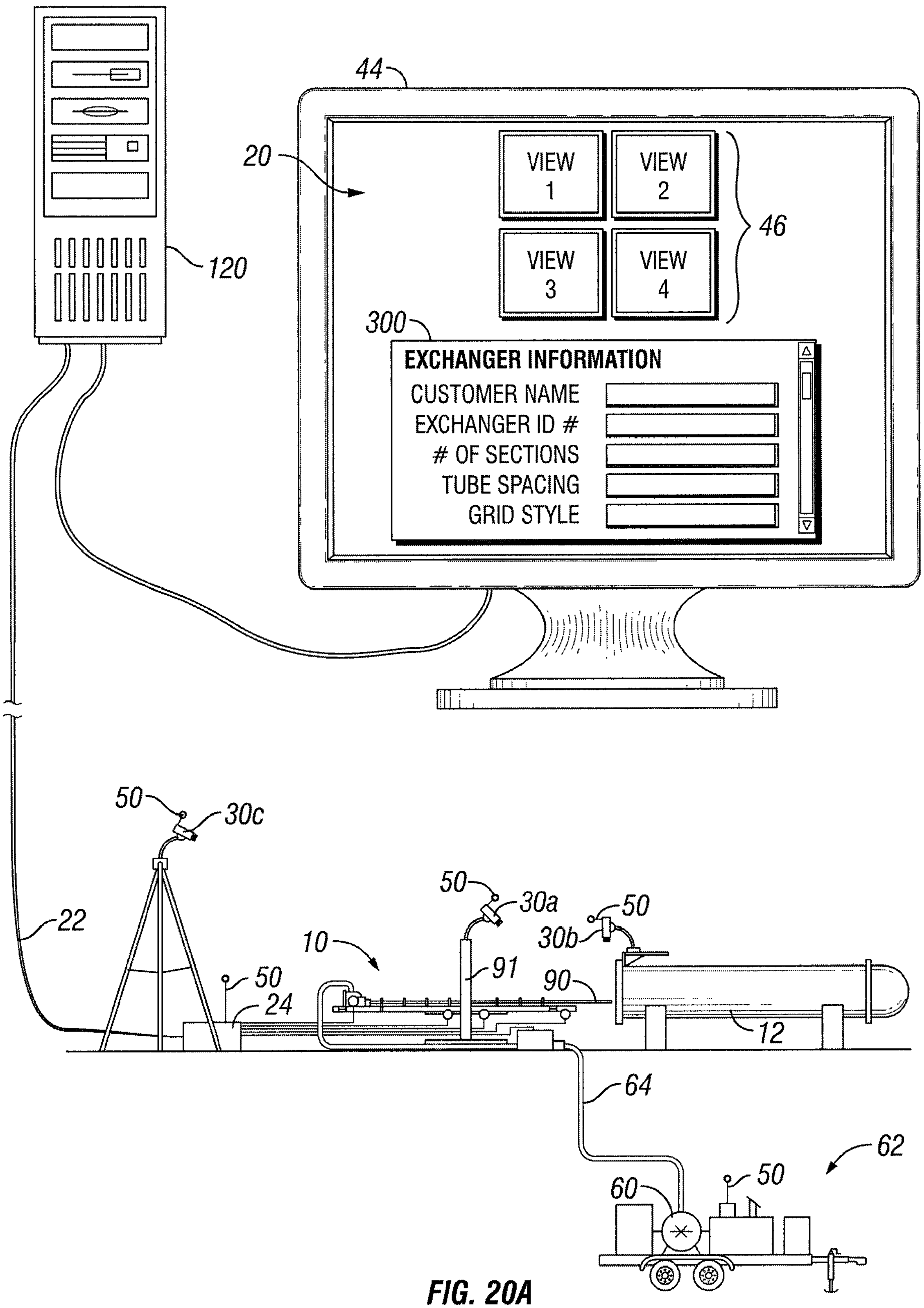
FIGS. 20A & B are a front view of a command station in an embodiment of an automated heat exchanger tube and industrial tube/pipe cleaning assembly and system.
Figure 20B:
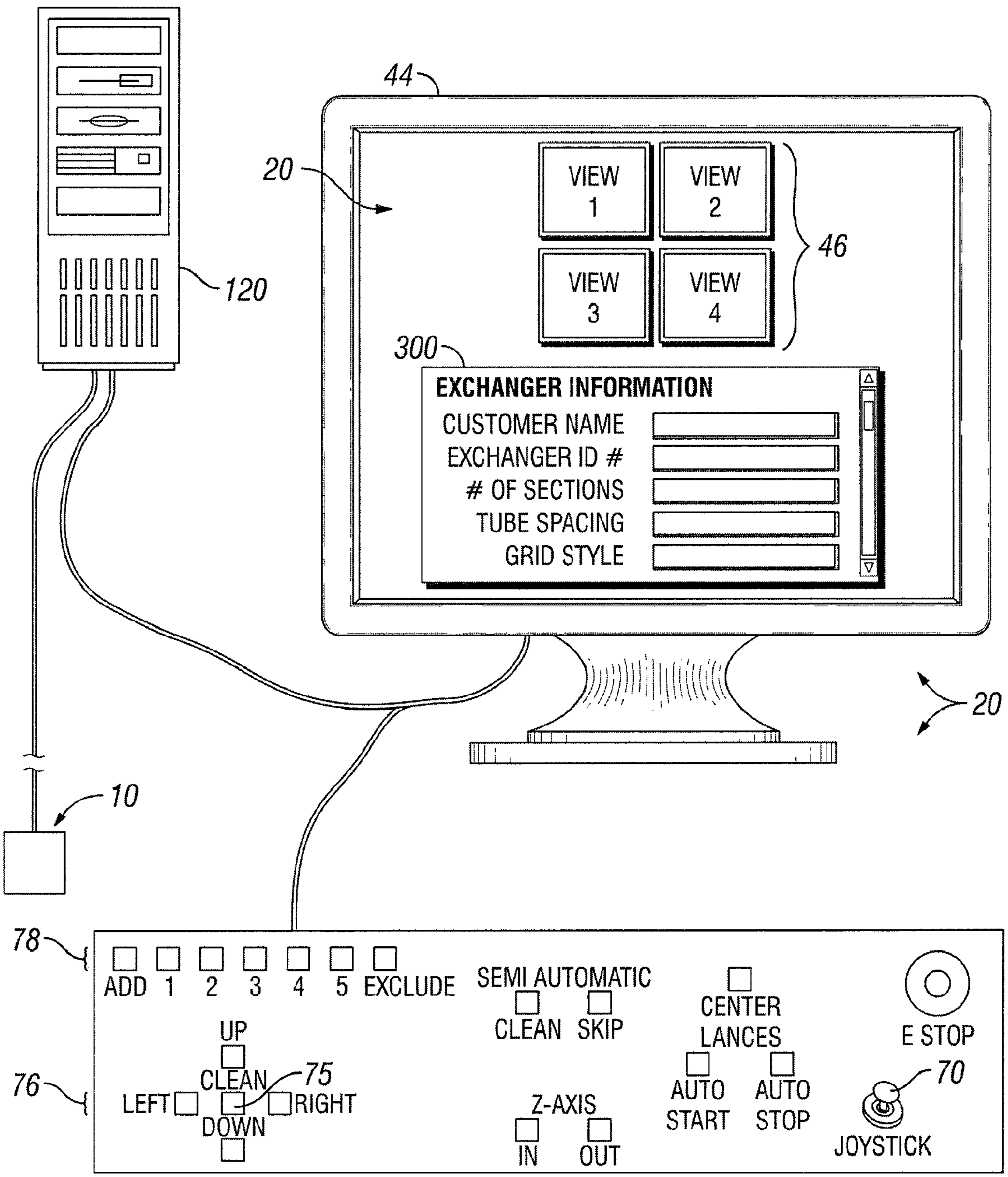

As illustrated in FIGS. 20A & 20B, the movements of, and variables relating to, the components of assembly 10 can be controlled via command station 44. In an illustrative embodiment, command station 44 may have one or more display modules and user input devices. For example, command station 44 can have one or more control consoles 20 with video monitor screens 46 for receiving live signals from cameras 30*a*, 30*b*, 30*c* & 30*d*. A plurality of different camera angles may be viewed at any one time. For example, at least one of the camera feeds can display the heat exchanger head flange 84 and tube sheets 80 to allow the operator to view cleaning occurring at that location. Command station 44 can also have one or more control consoles 20 with touch screen monitors 300 that an operator may utilize to input and monitor information such as the location of assembly 10, the positioning of lances 90 with respect to tubes 88, and the cleaning of tubes 88 in exchanger 12. Video monitor screens 46 and touch screen monitors 300 can all be viewable on a single control console 20. Alternatively, each of video monitor screens 46 and touch screen monitors 300 can be viewable on two or more separate control consoles 20, as desired. Command station 44 may also include one or more control consoles 20 with a manual operations station with buttons and instruments such as, for example, joystick controller 70, as illustrated in FIG. 20B. Each of the various control mechanisms on command station 44 may be located on and integrated with, for example, a touch screen monitor, a video monitor screen or a manual operations station, and fall within the scope of the various illustrative embodiments.

Figure 21:
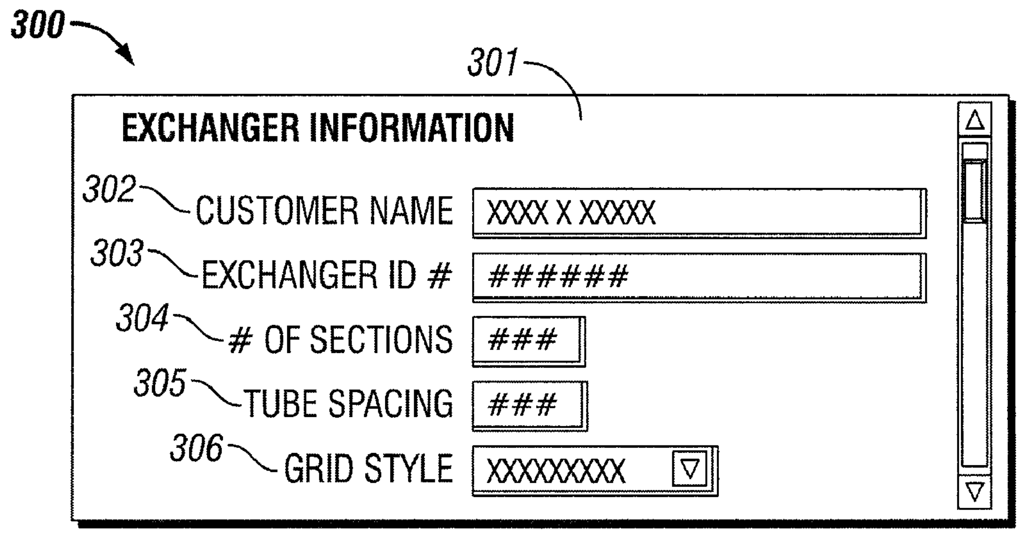
FIG. 21 is a front view of an exchanger information screen on a command station in an embodiment of an automated heat exchanger tube and industrial tube/pipe cleaning assembly and system.

Control console 20 and command station 44 can be integrated with motion control computer 120. Motion control computer 120 can direct an operator through a series of steps for locating and cleaning tubes 88 of exchanger 12. Each step can be performed via a different screen on touch screen monitor 300 of control console 20. For example, an "exchanger information" screen 301 on touch screen monitor 300 (see FIG. 21) may be utilized, whereby an operator can input, store and retrieve basic preliminary information related to cleaning. This information can include such items as customer name 302, exchanger ID#303, number of sections to define for cleaning 304, horizontal tube spacing or tube centers 305, and grid style 306.

Customer name 302 can be used for cataloging and storing information regarding existing tube patterns for future cleanings. Exchanger ID#303 can be the customer's ID for a particular heat exchanger 12 and can be used for cataloging and retrieval of information regarding the specific exchanger 12 for future cleanings. If the tube pattern of exchanger 12 has been previously defined, it can be retrieved using the exchanger ID#303, thus eliminating the need to describe and define the current tube pattern.

Number of sections 304 can be used to identify the number of sections that a tube sheet 80 will be divided into to accomplish the cleaning of heat exchanger 12. Each section can be defined either manually, iteratively, or using a previously defined grid section, which may then be mirrored either vertically or horizontally (if necessary) to quickly build the next section. Iterative defining can be operator assisted in an illustrative embodiment. Tube spacing 305 can describe, for example, the distance or pitch between the center point of two horizontally adjacent tubes.

Grid style 306 can describe whether the exchanger tube pitch is square or triangular. In a square grid style, tubes 88 on tube sheet 80 may be positioned with the tube spacing equal on a horizontal and vertical plane. For example, if there are four tubes in a square pattern with a tube spacing of 1.25" then the centers from tube to tube both horizontal and vertical will all equal 1.25". In a triangular grid style, tubes 88 can be positioned on tube sheet 80 with an equilateral triangular pattern, such that the tube spacing is equal on a horizontal plane, but different on the vertical plane. In this case the system can use a mathematical formula to calculate the proper tube pitch and adjust the movements accordingly.

Figure 22:
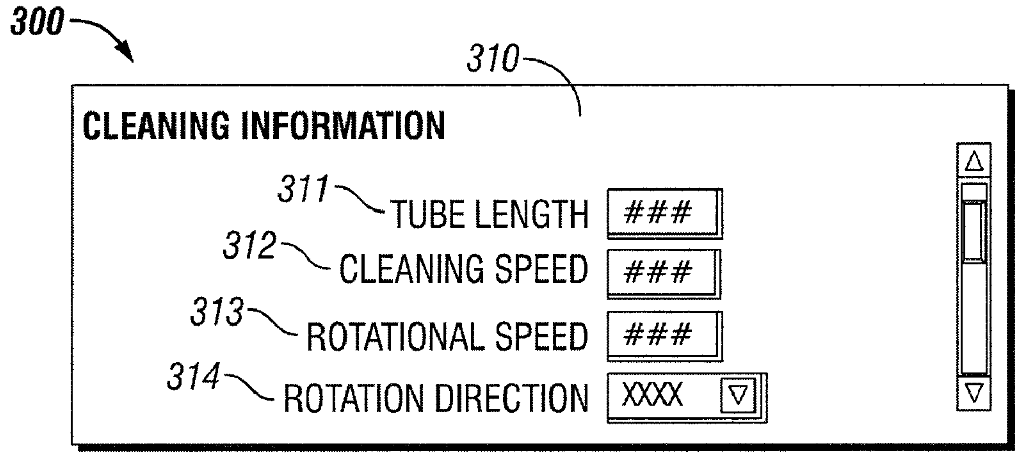
FIG. 22 is a front view of a cleaning information screen on a command station in an embodiment of an automated heat exchanger tube and industrial tube/pipe cleaning assembly and system.

A "cleaning information" screen 310 on touch screen monitor 300 (see FIG. 22) may also be utilized, whereby an operator can input information regarding such cleaning parameters as tube length 311, tube cleaning speed 312, lance rotation speed 313, and lance rotation direction 314. Tube length 311 will be set by the operator. Among the possible styles of bundles to be cleaned are straight tube bundles and u-tube bundles. The distance on a straight tube bundle can be set to adequately deliver lance 90 through the entire length of tube 88. On a u-tube bundle the tube length 311 can be set to clean to the tangent line of the bundle. This is because in a u-tube bundle, lance 90 can only clean to the tangent line without potentially damaging itself and/or tube 88.

Tube cleaning speed 312 can indicate the speed in which lance 90 will travel through the bundle. In an illustrative embodiment, there can be two different speeds: a speed moving in, and a speed moving out. The system can be programmed to auto adjust itself to a slower speed if the system encounters obstructions or plugging inside of tube 88. Thresholds can be set on the drive motor to back up and reduce tube cleaning speed before attempting to pass the obstruction. This can loop on pre-programmed intervals until the obstruction is overcome or the system hits a maximum attempt threshold and moves on to the next set of tubes 88.

Lance rotation speed 313 can be measured in revolutions per minute (RPM). The lances 90 can rotate between 0-3000 RPMs in an illustrative embodiment. Rotation direction 314 can indicate the direction in which the lances 90 will rotate. Rotational direction 314 can be set at clockwise or counterclockwise, as desired.

Figure 23:
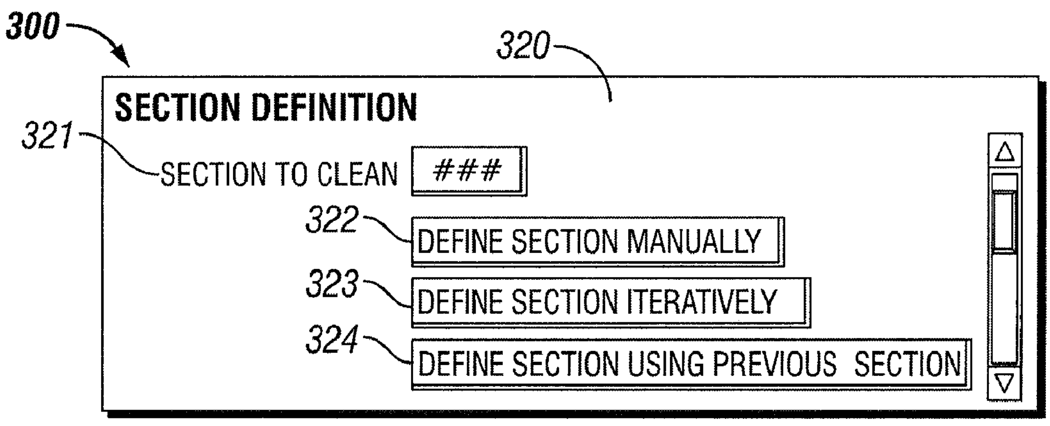
FIG. 23 is a front view of an section definition screen on a command station in an embodiment of an automated heat exchanger tube and industrial tube/pipe cleaning assembly and system.

A "section definition" screen 320 on touch screen monitor 300 (see FIG. 23) may also be utilized, whereby an operator can designate one or more sections on the face of tube sheet 80 of exchanger 12 and the tubes 88 in each specified section will be identified and cleaned. An operator can input, store and retrieve basic preliminary information related to each specific section on the face of tube sheet 80 that requires cleaning.

Initially, the operator can select a section for cleaning 321. This relates back to the number of sections 304 that the operator defined on the "exchanger information" screen 301. The operator may then define how the tubes 88 in that section will be identified. In the event that tube sheet 80 has multiple sections to be cleaned, the operator can define how cleaning will occur for each section.

Section definition can be through a manual process 322, an iterative process 323, or by using a previously defined section as a basis for defining the current section 324.

Manual Process 322

Figure 24A:
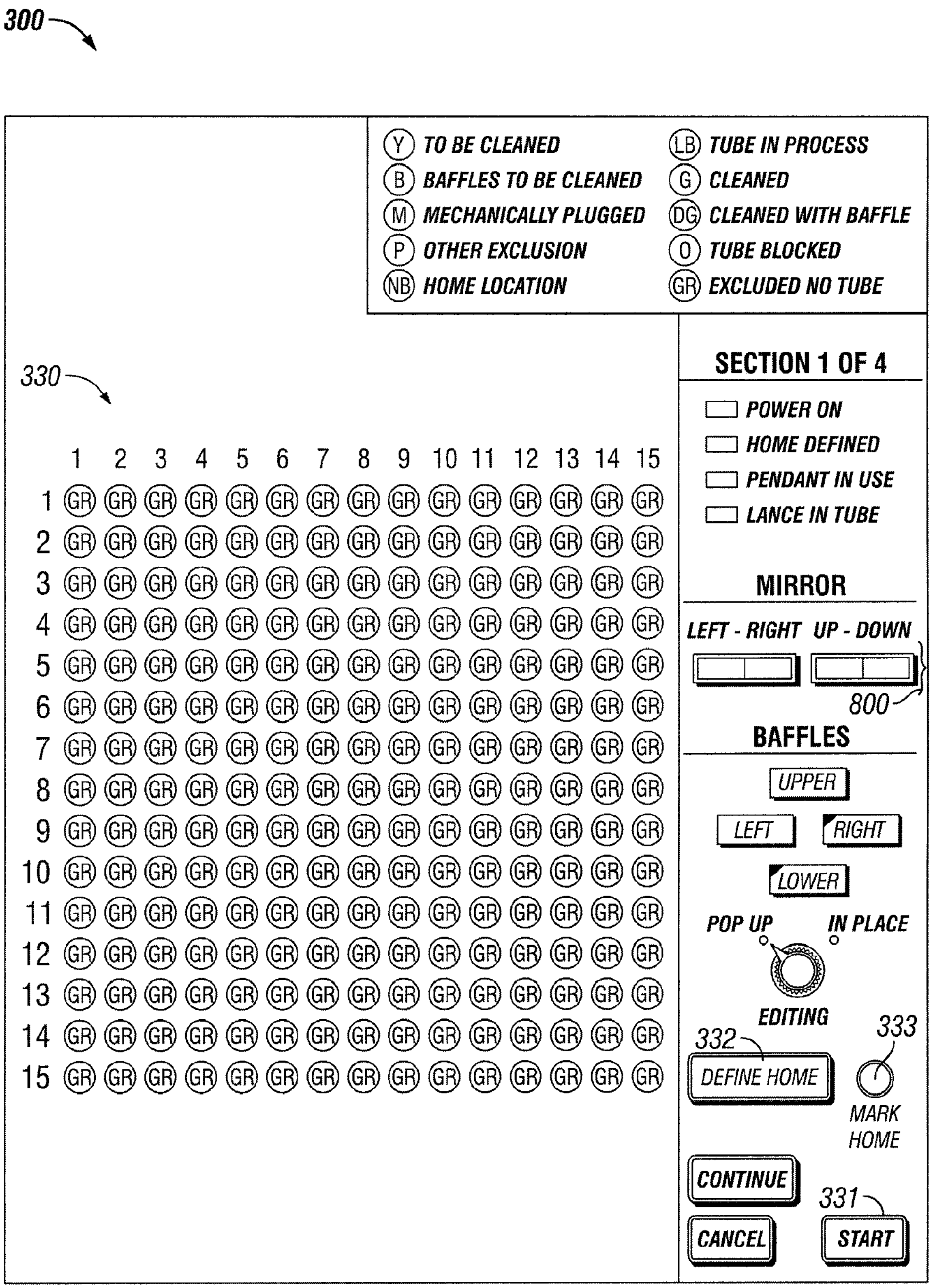
FIGS. 24A & B are front views of an edit screen for a manual process in an embodiment of an automated heat exchanger tube and industrial tube/pipe cleaning assembly and system.

FIGS. **24*a* & 24*b* are illustrative examples of an edit screen 330 for the manual process 322. Edit screen 330 can display a map that identifies the locations of tubes 88 on open end 86 of exchanger 12. The map of edit screen 330 can display information for two dimensions (x & y), or can be topographical and provide information for three dimensions (x, y & z) in relation to open end 86 of exchanger 12. In certain illustrative embodiments, an operator may utilize, for example, the touch screen functionality of edit screen 330 illustrated in FIGS. 24A & 24B, the manual instruments illustrated on FIG. 20B, or a combination thereof, in performing manual process 322**.

For example, the operator can utilize edit screen 330 to select grid size from a number of existing options such as, for example, 15×15 or 25×25, or the operator can create a custom grid that corresponds to the pitch of tubes 88, such as square or triangular. The custom grid can correspond to the spatial arrangement of tubes 88 on tube sheet 80. If tube sheet 80 has more tubes 88 than the custom grid can create, that section can be divided into smaller sub-sections for cleaning. The tube centers and pitch can be determined by the information entered on the "exchanger information" screen 301.

Figure 24B:
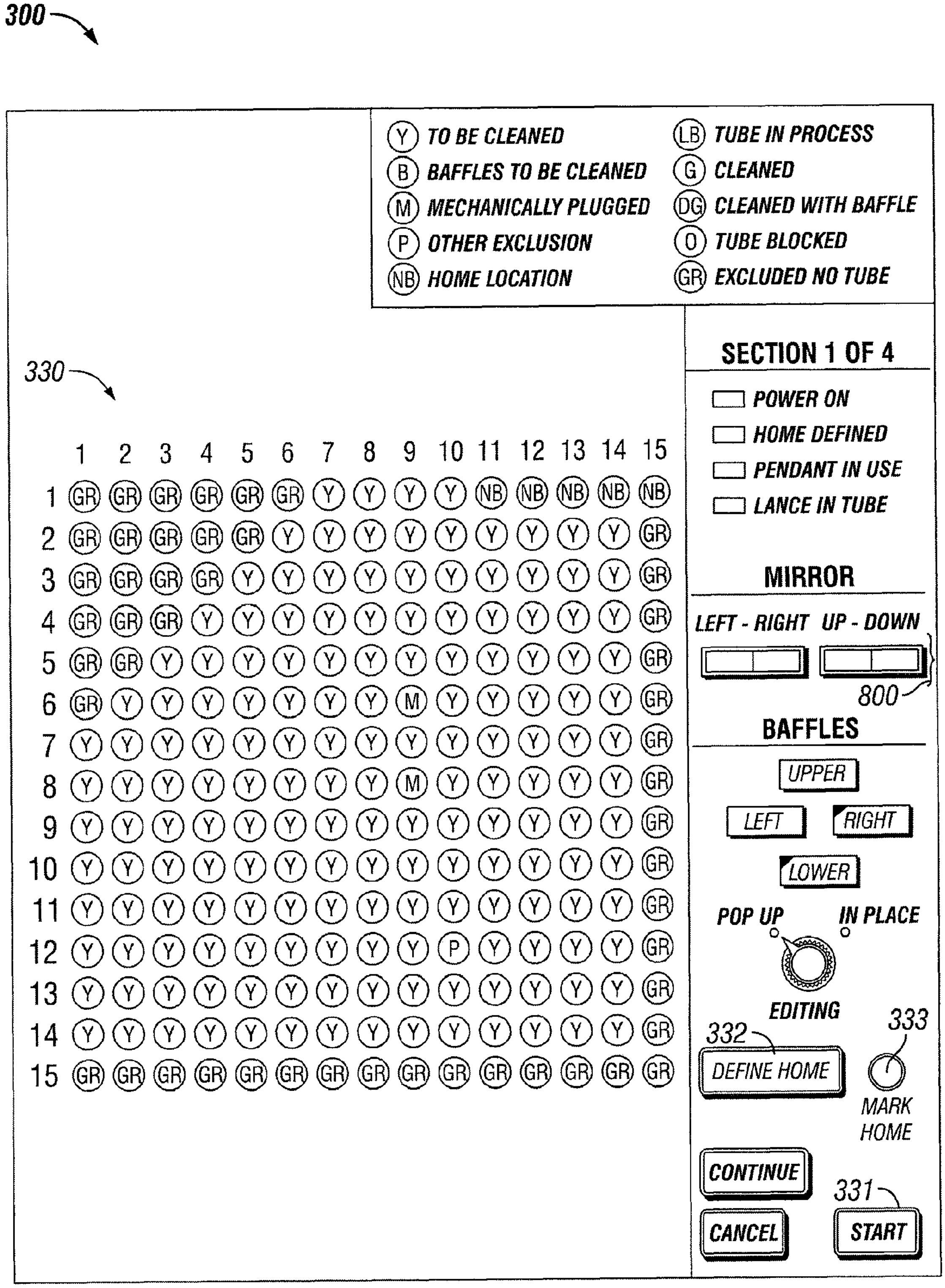

The tubes on edit screen 330 can correspond to the tubes 88 on the face of tube sheet 80. The operator can indicate the specific operation that will occur for each tube 88. The tubes on edit screen 330 can be color coded to indicate cleaning functions. In an illustrative embodiment, FIG. **24*a* is the initial edit screen 330 with all tubes labeled gray (GR) to indicate that initially, none of the tubes have been designated for cleaning. FIG. 24*b* is the edit screen after specific functions with corresponding color codes for the tubes have been entered. For example, navy blue tubes (NB) can indicate a home position, which is where the cleaning will begin and which can correspond to the location of lances 90 in the field. Yellow tubes (Y) can indicate tubes that will be cleaned. Green (G) can indicate tubes that have already been cleaned. Light blue (LB) can indicate tubes for which cleaning or designation is in process. Orange (O) can indicate a blocked tube. Gray tubes (GR) can indicate where tubes 88** have been excluded from cleaning. Maroon tubes (M) can indicate a mechanical plug. Brown tubes (B) can indicate a baffle exists immediately adjacent to this location. Dark green (DG) can indicate cleaned tubes, but with a baffle. Purple tubes (P) can indicate some other type of exclusion.

Once all relevant tubes have been marked on edit screen 330, the operator can set the home position (NB) tubes, preferably by engaging the "Define Home" button 332 in an illustrative embodiment. In the field, assembly 10 can be positioned with respect to tube sheet 80 such that lances 90 are lined up with the open ends 86 of tubes 88 that correspond to the home position (NB) tubes on edit screen 330. The operator can then engage the "Mark Home" button 333 in an illustrative embodiment. At this point, a start command can be initiated by engaging, for example, the "auto-start" button 351*a* as shown in the illustrative embodiment of FIG. 26 when in the automated cleaning mode, and cleaning can begin. The system can then clean, or not clean, each tube 88 according to the specific instruction that was given for that tube 88 via edit screen 330. Preferably, manual process 322 does not involve any repositioning of assembly 10 except to initially line up lances 90 with the home position (NB) tubes.

Iterative Process 323

FIGS. 25A, 25B, 25C and 25D are illustrative examples of an edit screen 340 for the iterative designation process 323. In certain illustrative embodiments, an operator may utilize, for example, the touch screen functionality of edit screen 340 illustrated in FIGS. 25A, 25B, 25C and 25D, the manual instruments illustrated on FIG. 20B, or a combination thereof, in performing iterative process 323.

For example, the iterative process 323 can involve selecting a plurality of points or locations via edit screen 340 that define the outer perimeter of a region of tube sheet 80 to be cleaned. Lances 90 and/or guide tubes 94 can be moved to these various points or locations on tube sheet 80, and the points or locations can be identified by motion control computer 120 as the outer boundary of a "cleaning region". Motion control computer 120 may then instruct assembly 10 to clean the tubes 88 located at the identified point or locations.

In an illustrative embodiment, the operator can use joystick controller 70 and/or any other required instruments from command station 44, such as the Up/Down/Left/Right buttons 76 as shown in FIG. 20B, to move lances 90 around the desired cleaning perimeter to effectively define the outer boundaries of the region to be cleaned.

Figure 25A:
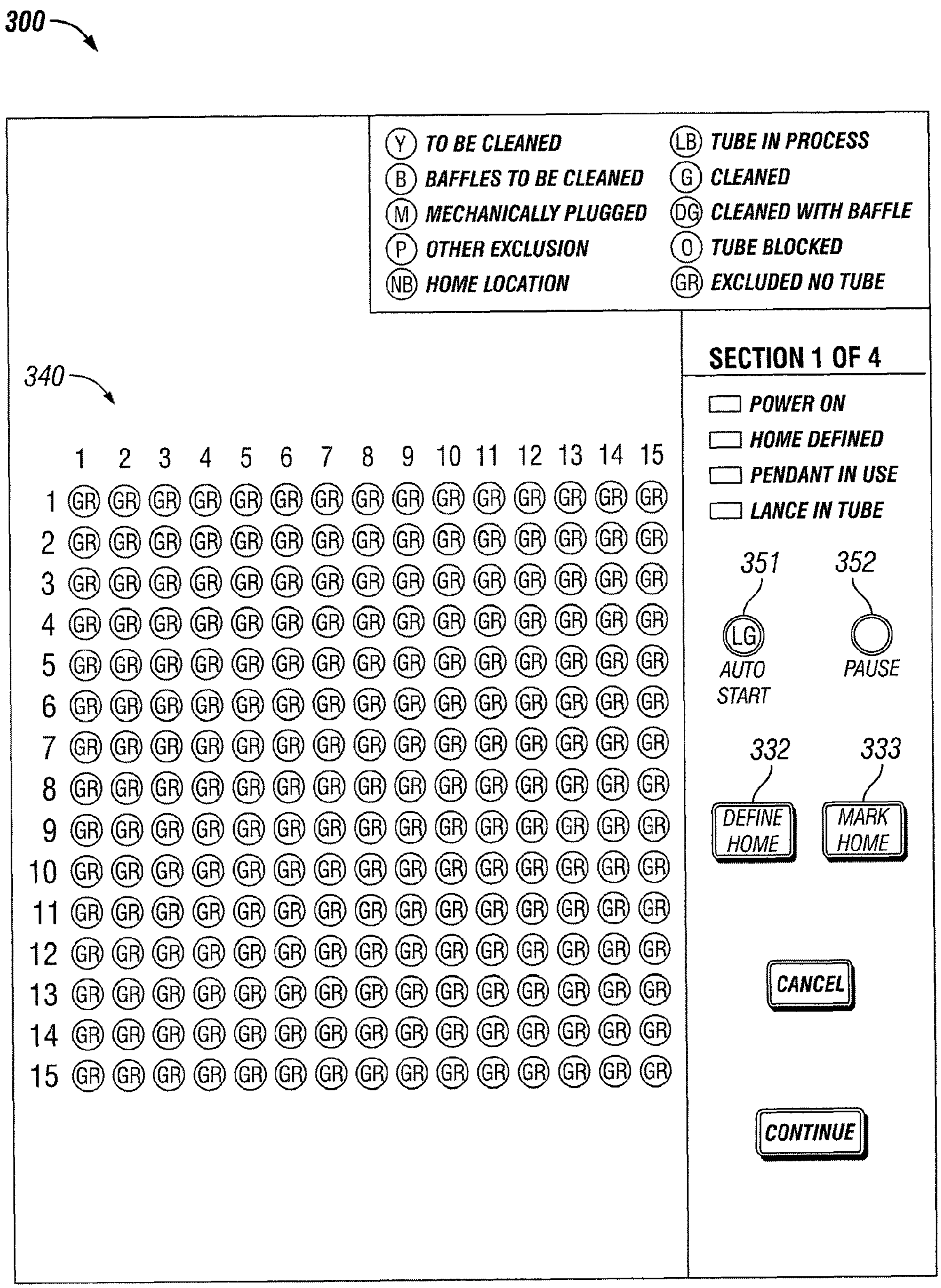
FIGS. 25A, B, C & D are front views of an edit screen for an iterative process in an embodiment of an automated heat exchanger tube and industrial tube/pipe cleaning assembly and system.

FIG. 25A shows the initial edit screen 340 in an illustrative embodiment. Initially, edit screen 340 can display a grid of possible tube locations that correspond to tube sheet 80. If desired, the operator can narrow down this quadrant to a grid size of, for example, 15×15, 25×25 or a custom grid less than 25×25. The operator can then define the region within the created grid that corresponds to the outer perimeter of tubes 88 to be cleaned.

In an illustrative embodiment of iterative process 323 where five lances 90 are utilized, the operator first selects five adjacent tubes 88 (either horizontal, vertical or diagonal) on edit screen 340 to be considered the home location. This will turn those tubes navy blue (NB) on edit screen 340. Operator can then utilize joystick controller 70 to move lances 90 to the location on tube sheet 80 that corresponds to the home location. A "clean" button 75 (See FIG. 20B) can be engaged, and the tubes 88 corresponding to the home location can be cleaned.

The operator can next select a second location on the outer perimeter of the region to be cleaned and identify this location on edit screen 340. The "clean" button 75 can be engaged, and the tubes 88 corresponding to this second location can be cleaned.

The operator can continue to designate the desired cleaning perimeter on tube sheet 80 by selecting additional locations on the perimeter to define a cleaning region and build a computer image of the tube sheet 80. At each location, the "clean" button 75 can be engaged, and the tubes at that particular location can be cleaned.

Figure 25B:
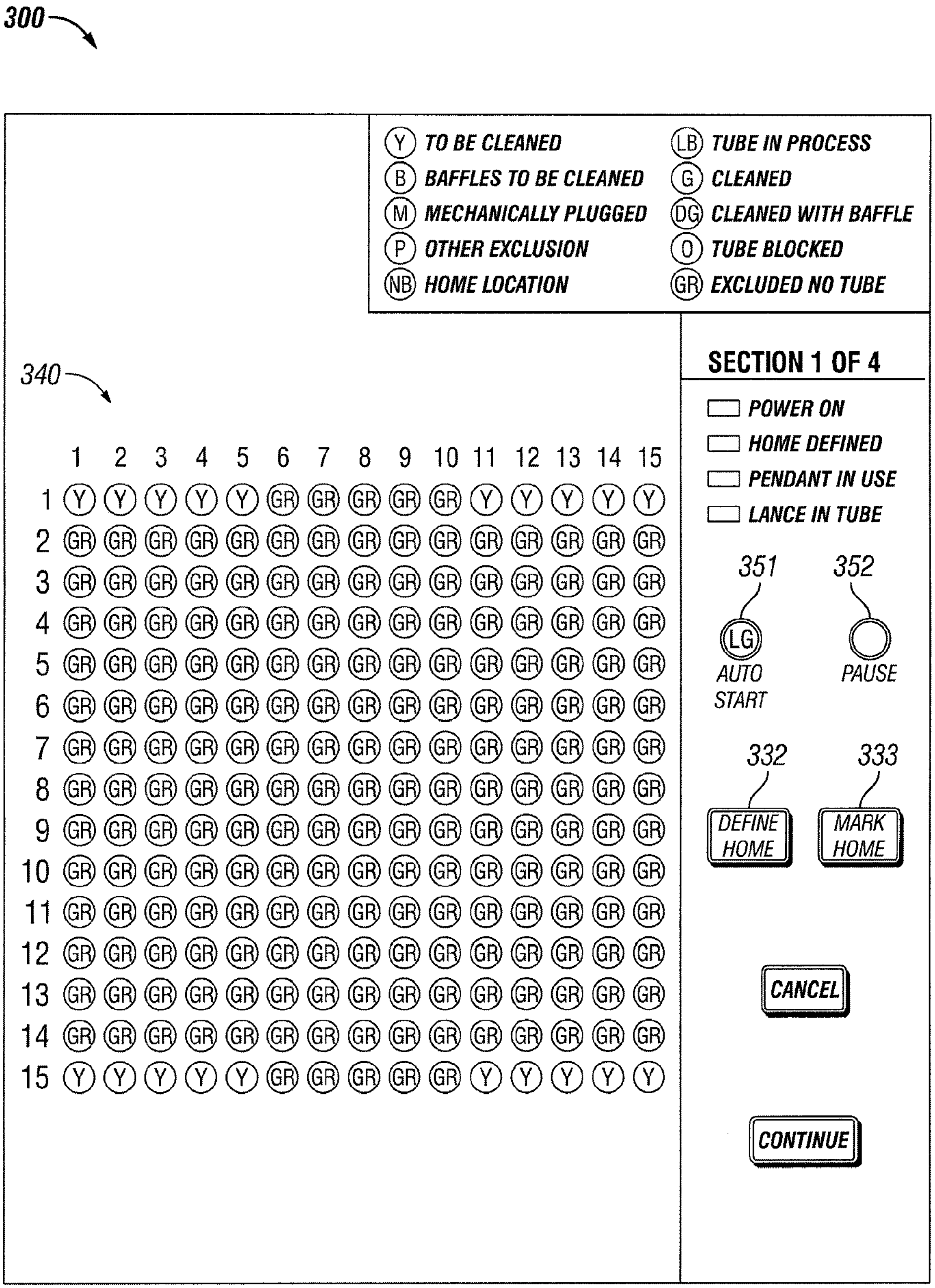
Figure 25C:
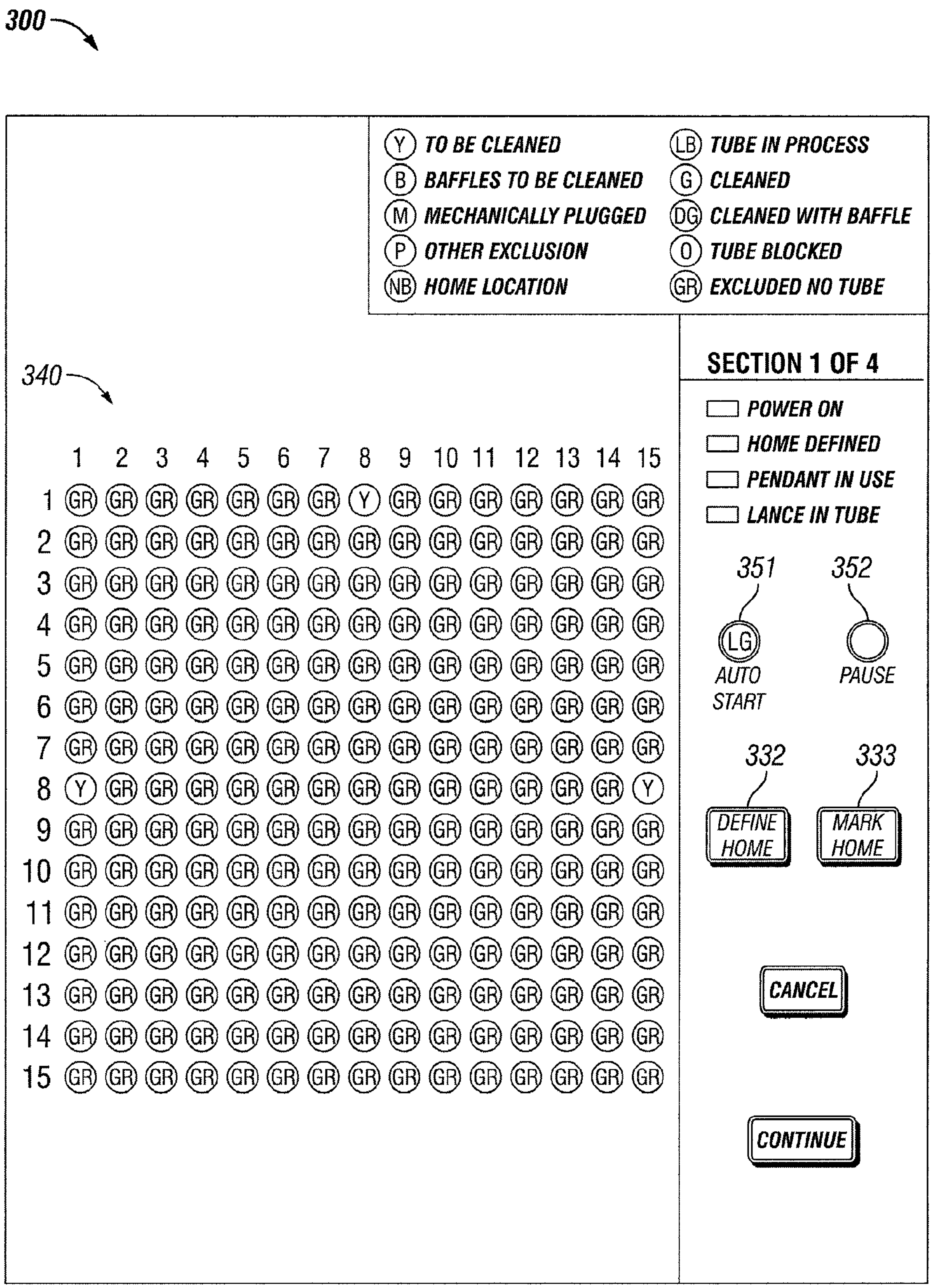
Figure 25D:
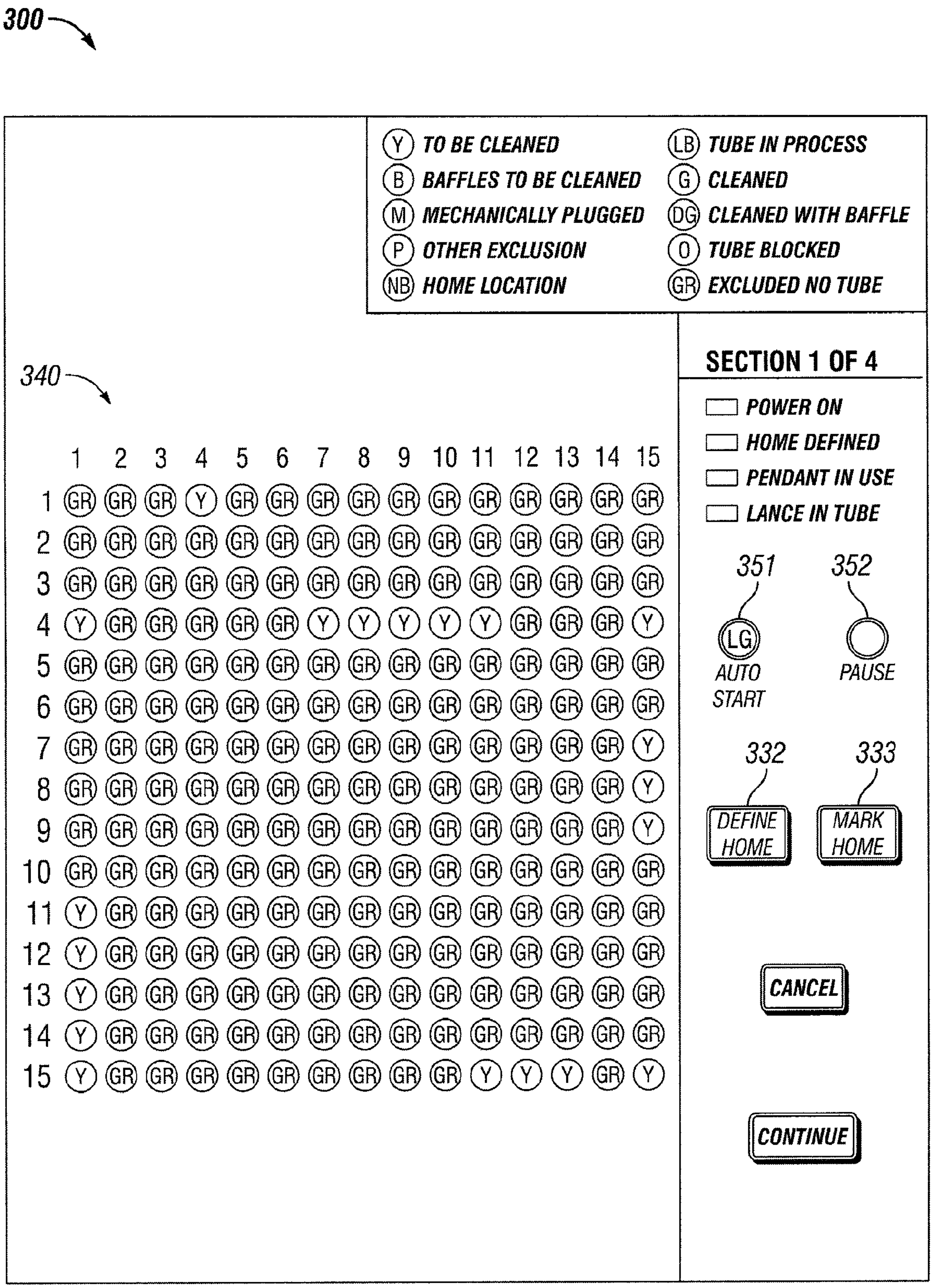

Identifying the perimeter can involve selecting as few as four locations on tube sheet 80 to create a square region, or as many as twenty-six (or more) locations on a 25×25 grid, assuming one side has a jagged pattern. For example, FIG. 25B shows the edit screen 340 after a rectangular shaped cleaning region has been designated using four groups of five location points, FIG. 25C shows the edit screen 340 after a triangular shaped cleaning region has been designated using three single location points, and FIG. 25D shows the edit screen 340 after a non-uniformly shaped cleaning region has been designated using a plurality of groups having varying numbers of edit points.

Figure 26:
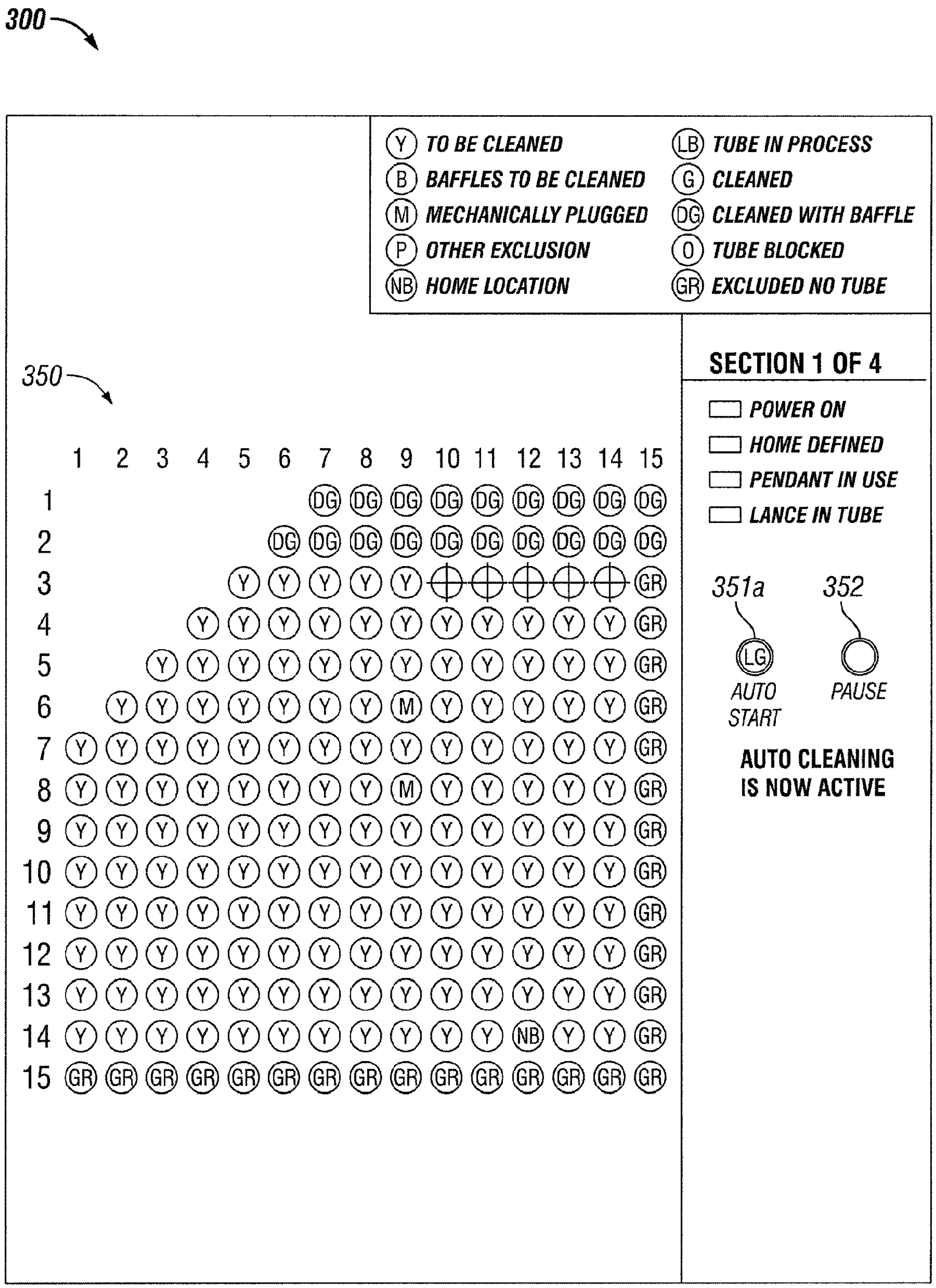
FIGS. 26 is a front view of an edit screen for an iterative process with cleaning in progress in an embodiment of an automated heat exchanger tube and industrial tube/pipe cleaning assembly and system.

Once the operator has defined the outer parameters for the desired region to be cleaned in the iterative process 323, or the entire region to be cleaned in the manual process 322, the operator can engage the "auto start" button 351*a* of FIG. 26 in an illustrative embodiment. This indicates that designation of the outer perimeter of the region to be cleaned has been completed and cleaning of the tubes within this region can begin. At this time, lances 90 will return to the home location and begin the cleaning process.

In an illustrative alternate embodiment, iterative process 323 can involve identifying all the desired points on the perimeter of the region to be cleaned as an initial step. In a subsequent step, the "auto start" button 351*a* can be engaged to initiate cleaning of all the tubes 88 identified in connection with the initial step. At this time, lances 90 will return to the home location and begin the cleaning process.

Previously Defined Section 324

When defining the section to be cleaned, the operator may mirror a previously defined section 324, either left-to-right or up-to-down, using mirror buttons 800 (see FIGS. 24A & B) in an illustrative embodiment. Mirror imaging can also be utilized in the manual 322 and iterative 323 processes in illustrative embodiments. Operator may also add or delete tubes 88 in the new mirror image. Alternatively, the operator may utilize the information from a previously defined section in one or more subsequent sections.

FIG. 26 is an illustrative example of a cleaning-in-progress screen 350 for the manual process 322 and/or the iterative process 323. In an illustrative embodiment, a "pause" button 352 can be utilized to pause the cleaning process, and the "auto start" button 351*a* can be utilized to re-start the cleaning process after being paused. In another illustrative embodiment, the "auto start" button 351*a* on cleaning-in-progress screen 350 can be utilized to begin the cleaning process after designation has occurred on edit screens 330 or 340. Alternatively, a "start" button 331 can be provided on edit screen 330 or an "auto start" button 351 can be provided on edit screen 340 to begin the cleaning process directly from either of those screens, in an illustrative embodiment.

During the cleaning process, the crosshairs in FIG. 26 can indicate the current position of lances 90. The five tubes on the 3$^{rd}$ row, right hand side of FIG. 26 designated by the crosshairs are in the process of being cleaned. The dark green tubes (DG) in FIG. 26 have a baffle, and have already been cleaned. Mechanically plugged tubes can be identified by the color maroon (M), and tubes to be cleaned can been identified by the color yellow (Y).

In various illustrative embodiments, movement of lances 90 can be performed by an operator in the field or using cleaning-in-progress screen 350, or otherwise via command console 20. Further, in certain illustrative embodiments, automatic control, manipulation and navigation of lances 90 can comprise some level of robotic manipulation of lances 90. Also, a plurality of add/exclude buttons 78 on control panel 20 (see FIG. 20B) can be utilized to add or remove one or more tubes 88 from the cleaning process as desired. Add/exclude buttons 78 can be utilized when defining the cleaning region or during actual cleaning. Further, add/exclude buttons 78 may be utilized during mirroring or during any other phase of the cleaning process described in the various illustrative embodiments.

Figure 27:
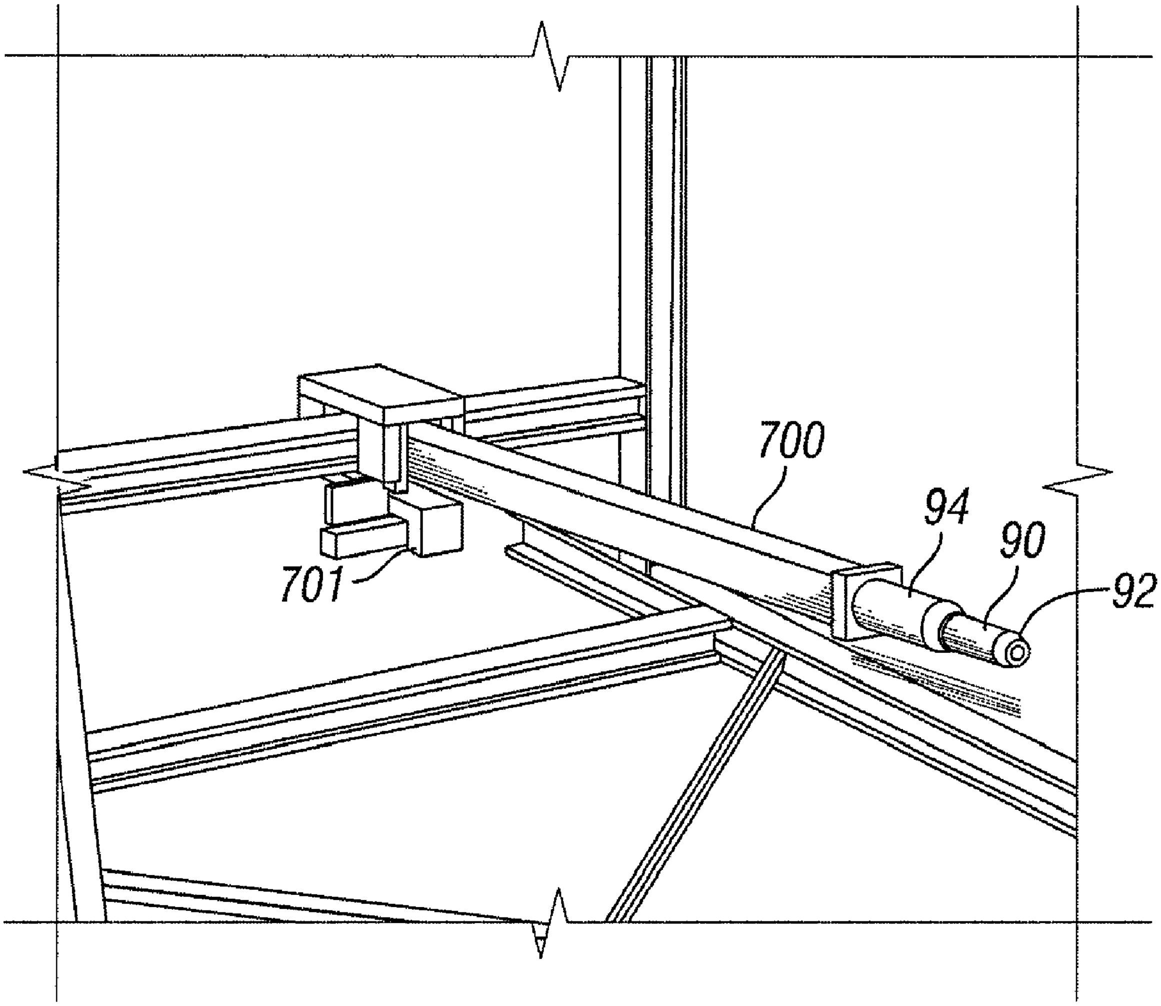
FIG. 27 is a perspective view of a lance track adjustment ram in an embodiment of an automated heat exchanger tube and industrial tube/pipe cleaning assembly and system.

In the event that assembly 10 and tubes 88 are not on a perfectly horizontal or vertical plane and/or do not line up properly, assembly 10 can tilt up, down, left or right to accurately line up with tubes 88. Assembly 10 can include a motor and lance track tilt ram 701 to ensure that any tilt action stays level throughout the entire cleaning process, as needed. Further, in the event that open end 86 of heat exchanger 12 does not have a flush face (for example, a channel head), assembly 10 may be capable of extending forward and accessing the tube sheet even when a channel head is present. Lance track adjustment ram 700 can extend out to access tubes 88 as needed. An illustrative embodiment of lance track adjustment ram 700 and lance track tilt ram 701 are shown in FIG. 27.

A calibration routine can be used to determine the angular dimensions of tubes 88 within tube sheet 80, which can be relevant in determining, for example, if assembly 10 or any of its components will need to be tilted or moved a distance from the horizontal plane in order to access tubes 88. In an illustrative embodiment of the calibration routine, the operator can manually place the lances 90 within tubes 88, at two different points, on the same row of tubes 88 of heat exchanger 12. This can define the angle of tubes 88 within tubesheet 80 with respect to assembly 10, thus determining the necessary tilt angle.

In the event that tube sheet 80 has an irregular cleaning pattern, assembly 10 can be modified to include any desired number of lances. For example, a single lance 90 may be utilized to do follow-up cleaning of any tubes 88 that could not be accessed by a five lance 90 system during initial cleaning.

FIGS. 28-33 are flow diagrams for various illustrative embodiments of an automated heat exchanger tube and industrial pipe/tube cleaning method and system. FIGS. 28-33 can be utilized in connection with a computerized program that is operational with motion control computer 120, in an illustrative embodiment.

Figure 28A:
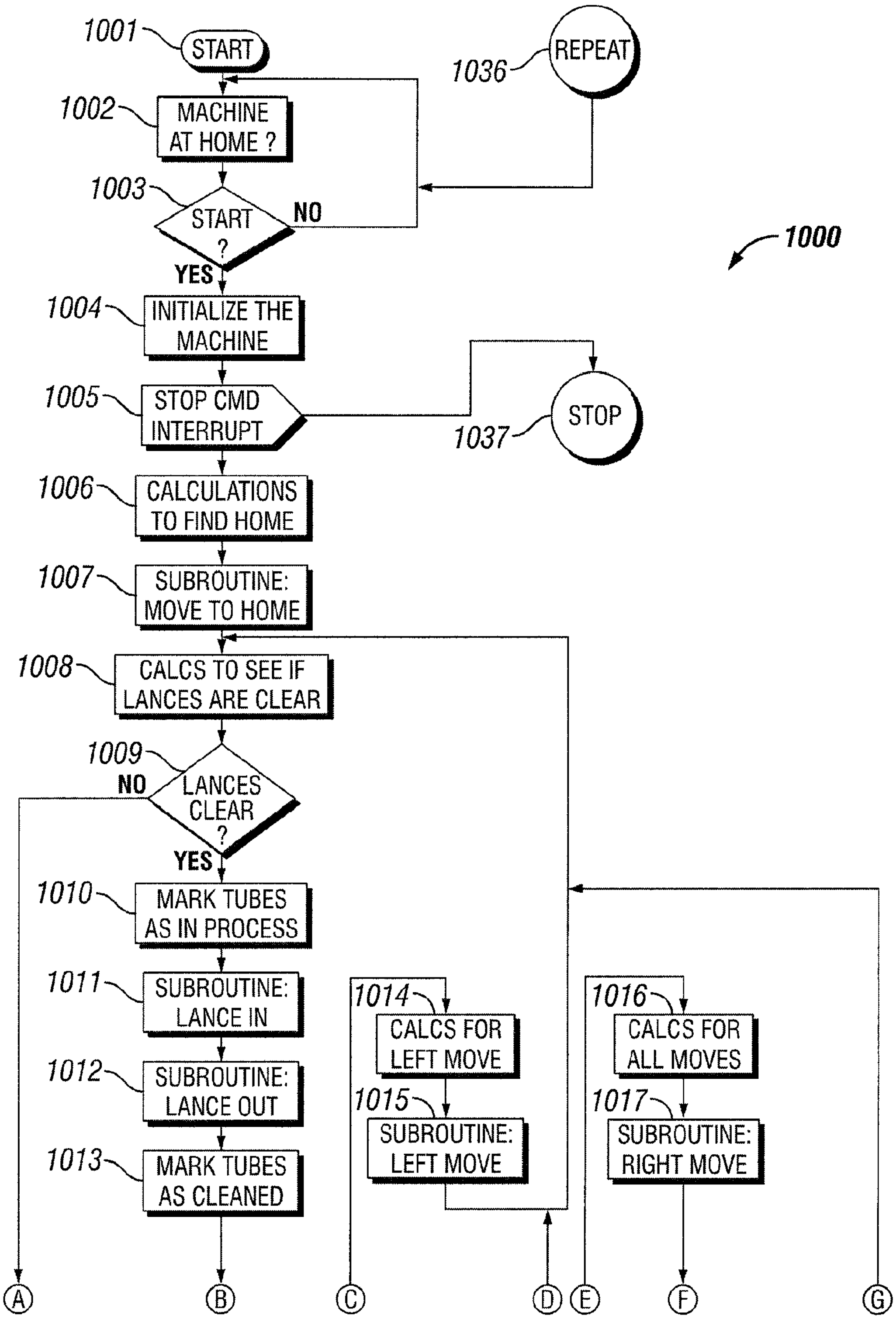
FIGS. 28-33 are flow diagrams for various embodiments of an automated heat exchanger tube and industrial tube/pipe cleaning process and system.
Figure 28B:
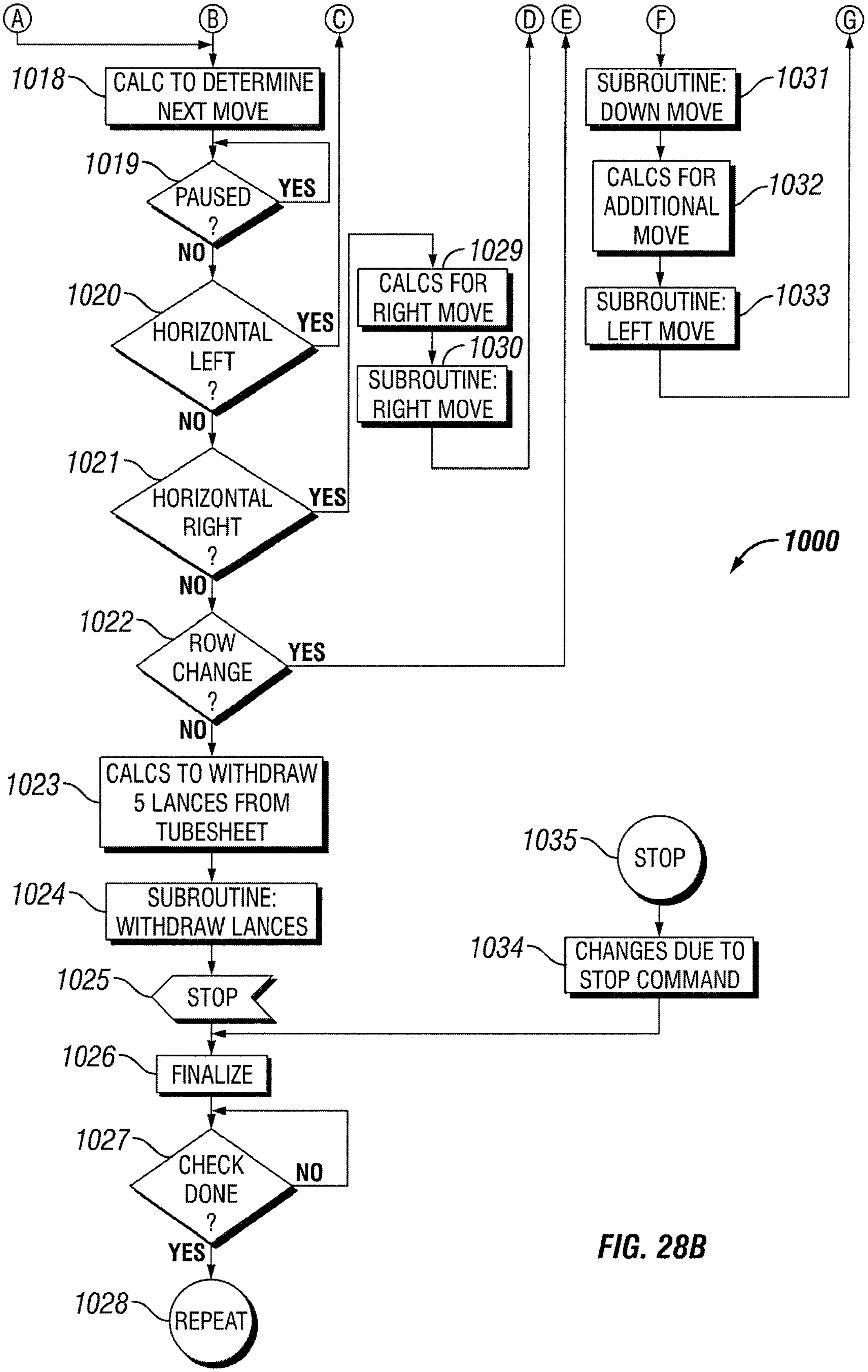
Figure 29:
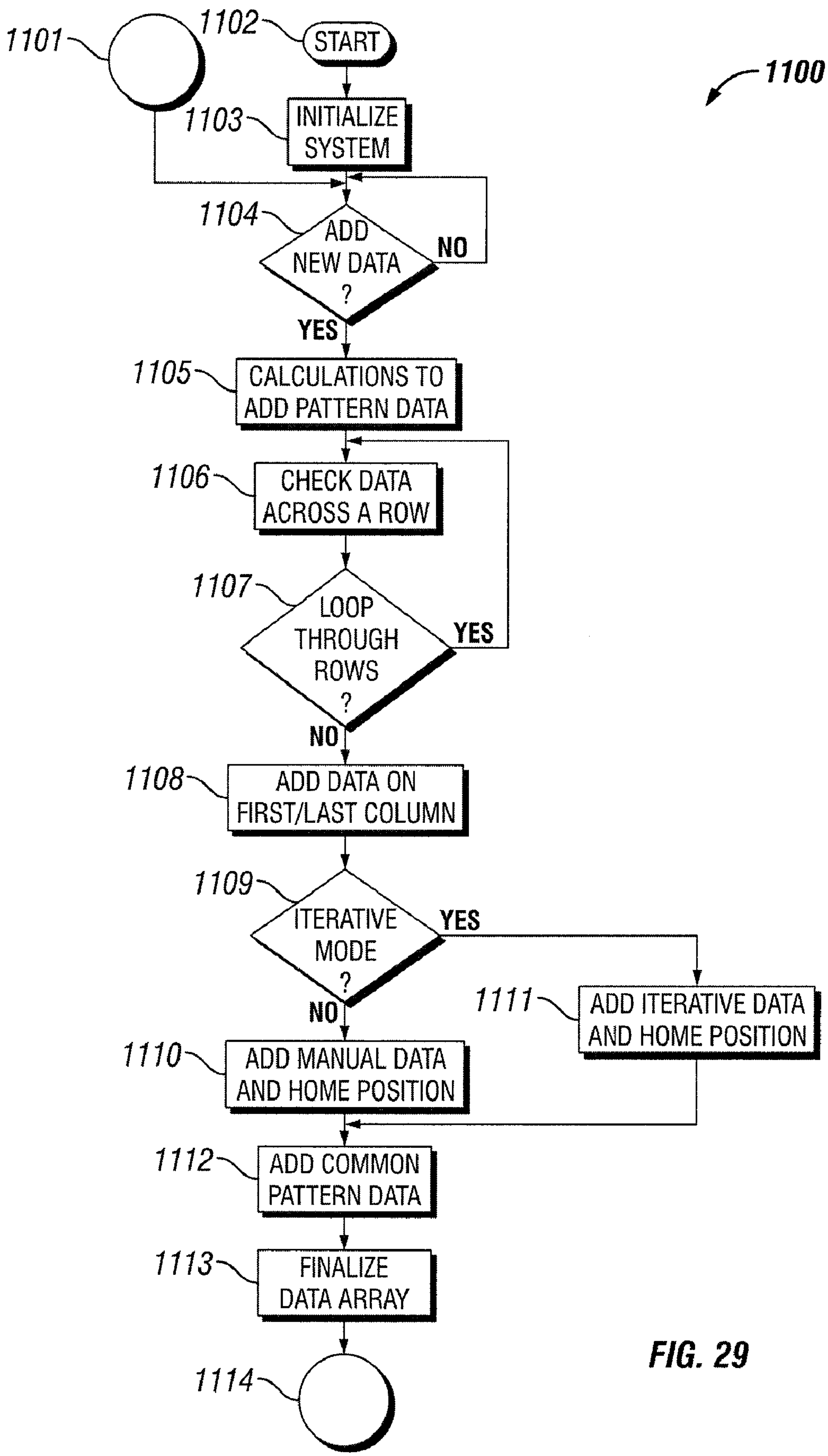

FIGS. 28A & 28B are an illustrative embodiment of a pattern following routine 1000 having blocks 1001-1037. This flowchart can utilize pattern data (as illustrated in FIG. 29) to navigate or move lances 90 sequentially through each tube 88 in tube sheet 80. In an illustrative embodiment, this can be the main control program governing the navigation or movement of lances 90 and/or other components of assembly 10 in an automatic mode. This program can commence upon engaging the "auto start" button 351*a*, as shown in FIG. 26. After the "auto-start" button 351*a* has been engaged, lances 90 preferably move to the home position, which can be in either the upper right or upper left of the pattern on tube sheet 80 in an illustrative embodiment. Alternatively, home position can be any position that allows for ease of cleaning as determined by the operator. Starting at the home position, and following the mathematical definition of the grid, lances 90 can sequentially loop through each row of tubes 88 on tubesheet 80, automatically cleaning the accessible tubes (in a multiple lance system). This sequential cleaning can continue until all of the accessible tubes 88 have been cleaned. In an illustrative embodiment in which multiple lances 90 are utilized and one or more tubes cannot be cleaned, the uncleaned tubes may be accessible using the program of FIG. 30.

FIG. 29 is an illustrative embodiment of an add pattern data routine 1100 having blocks 1101-1114. This flowchart can represent the decision tree used to receive the graphical information or other user input entered by the operator on the map of the tube sheet, either in the manual process 322 or the iterative process 323. For the manual process 322, it can be performed after the completion of the definition of the complete grid. For the iterative process 323, it can be performed after the completion of the definition of the cleaning perimeter of the grid. In an illustrative embodiment, motion control computer 120 can scan the information on the display of edit screen 340 and process and convert this visual information to data usable by assembly 10. Preferably, this is done by sequentially scanning each row. Additional pattern information can be added until a complete mathematical definition of the grid is accomplished.

Figure 30:
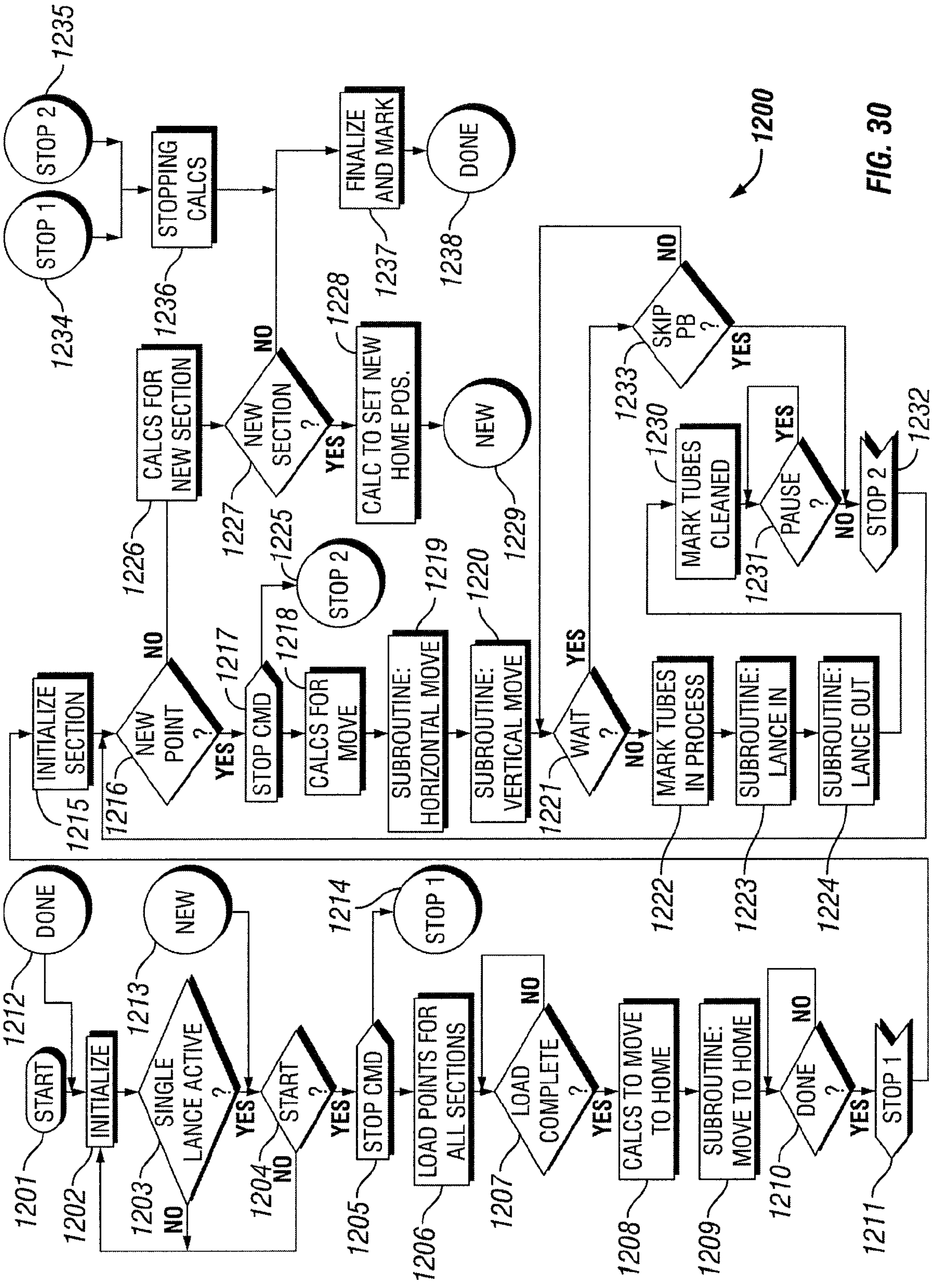

FIG. 30 is an illustrative embodiment of a single lance routine 1200 having blocks 1201-1238. After all tubes 88 of tube sheet 80 have been cleaned using a setup with multiple lances 90, there can be one or more tubes 88 on the tubesheet 80 which were not accessible and could not be cleaned. These tubes 88 can be cleaned one at a time after converting the multiple lance 90 configuration to a single lance 90 configuration. This decision tree of FIG. 30 can coordinate the motion of a single lance 90 to each excluded tube 88. Working through each section, the scattered uncleaned tubes 88 can be cleaned one-by-one using a single lance 90. At each tube 88, the operator can have the option of cleaning or skipping that tube 88.

Figure 31:
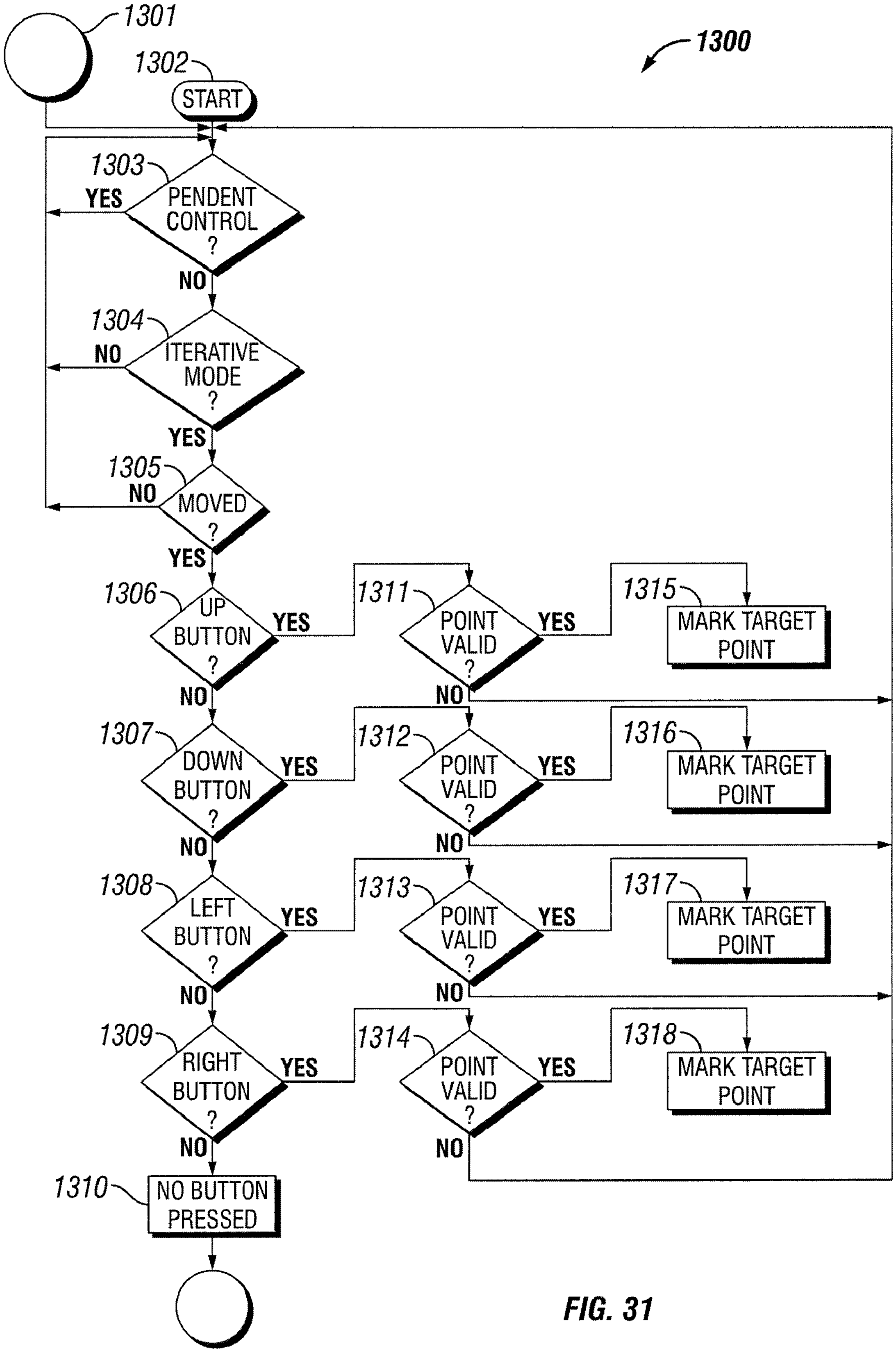
Figure 32:
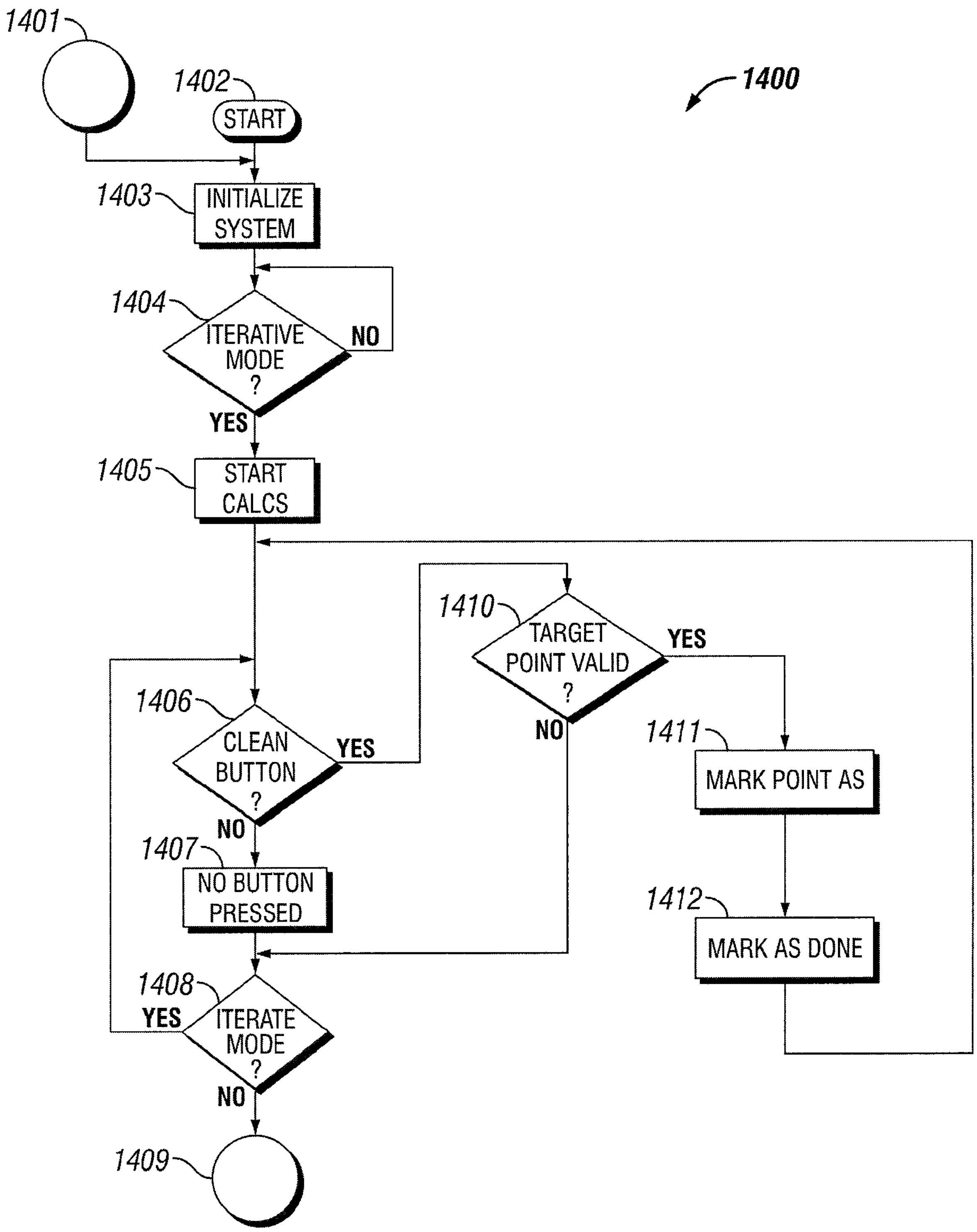

FIGS. 31 and 32 are illustrative embodiments of iterative sub program routines 1300 & 1400, having blocks 1301-1318 and 1401-1412, respectively. These two programs can work together to define reference points on the perimeter of the regions to be cleaned when using the button method. FIG. 32 can be used to move a target position one step at a time in either the up, down, left, or right direction using up/down/left/right buttons 76 (see FIG. 20B). When the "clean" button 75 is pressed, FIG. 32 can validate the target position and, if valid, add the target position to the perimeter of the region to be cleaned. The actual movement of lance 90, as well as the actual cleaning of a tube 88, can be performed using the program of FIG. 33 in an illustrative embodiment.

Figure 33A:
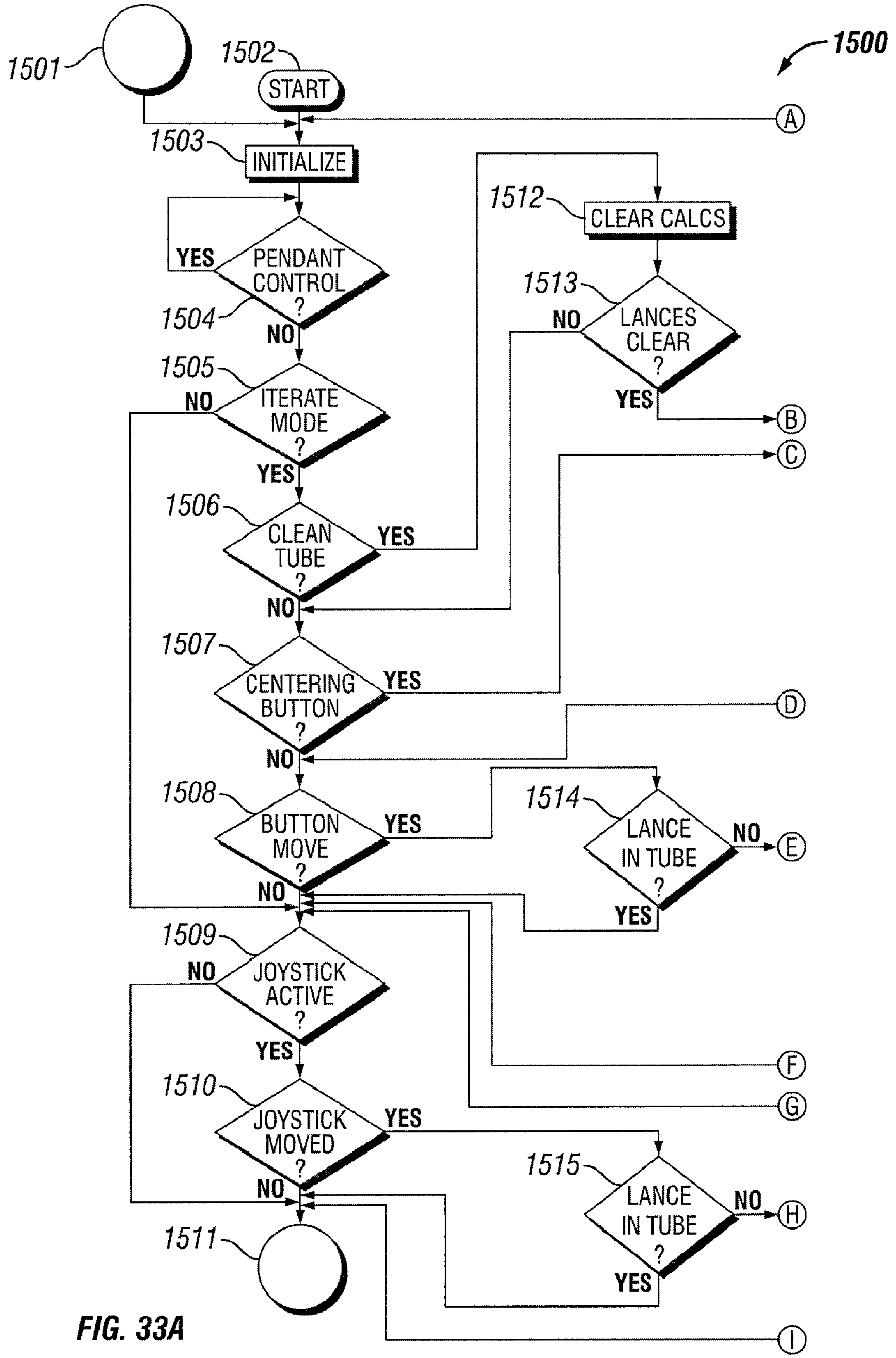
Figure 33B:
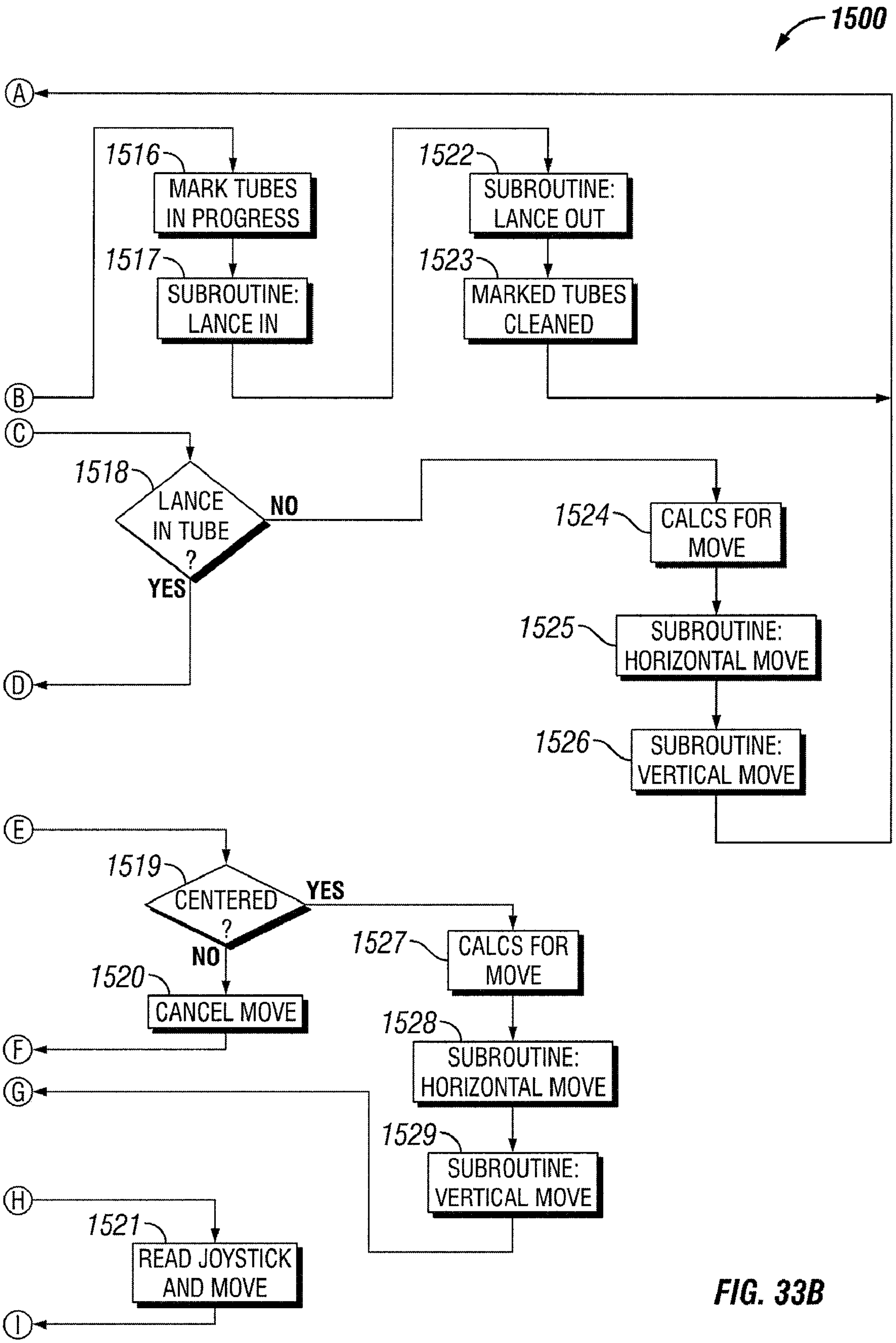

FIG. 33 is an illustrative embodiment of an iterative main program 1500 having blocks 1501-1529. FIG. 33 can represent the main decision tree for the iterative process 323 of defining the grid. In an illustrative embodiment, it can contain three parts: (1) a main control section for cleaning the tubes 88 which have been defined on the perimeter of the region to be cleaned; (2) a joystick method of defining the points on the perimeter, and (3) movement of lances 90 in response to the button method of defining points on the perimeter. FIG. 33 does not include the actual definition of the points using the button method, only the movement of lances 90 in response to the definition. The button method of definition can be done in the illustrative embodiments of FIGS. 31 and 32. When a point has been marked on the perimeter of the region to be cleaned (using, for example, either the joystick controller 70 or the up/down/left/right buttons 76), those tubes 88 may then be cleaned.

In an illustrative embodiment, assembly 10 may be located inside of a protective container 600 (not shown). Container 600 may have doors located on both ends. Container 600 can protect assembly 10 from outside elements such as rain, wind and can provide a more stable environment for shipping and relocating.

Figure 34:
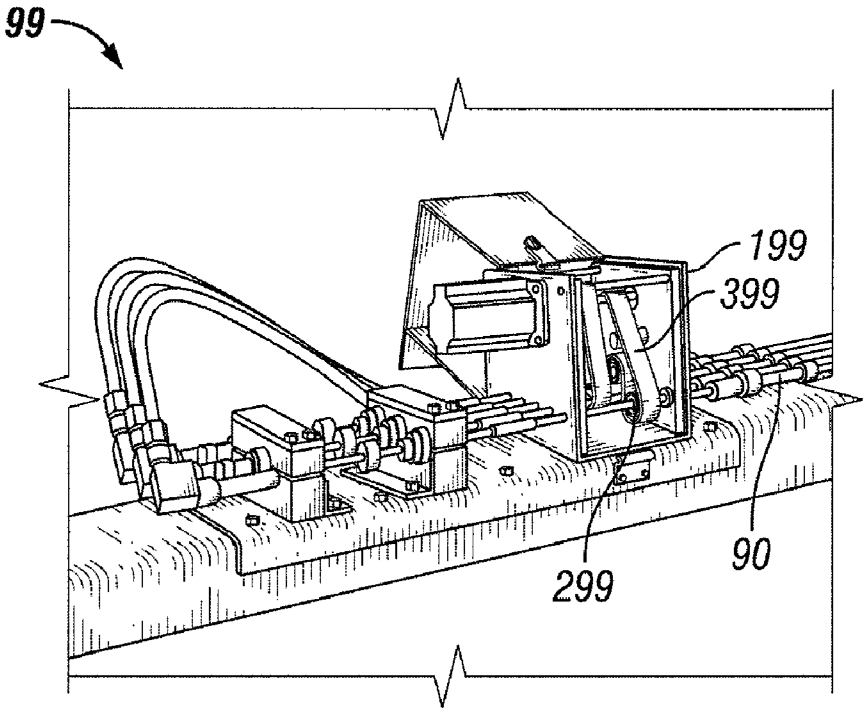
FIGS. 34-36 are perspective views of a tube cleaning lance rotating device in an embodiment of an automated heat exchanger tube and industrial tube/pipe cleaning assembly and system.
Figure 35:
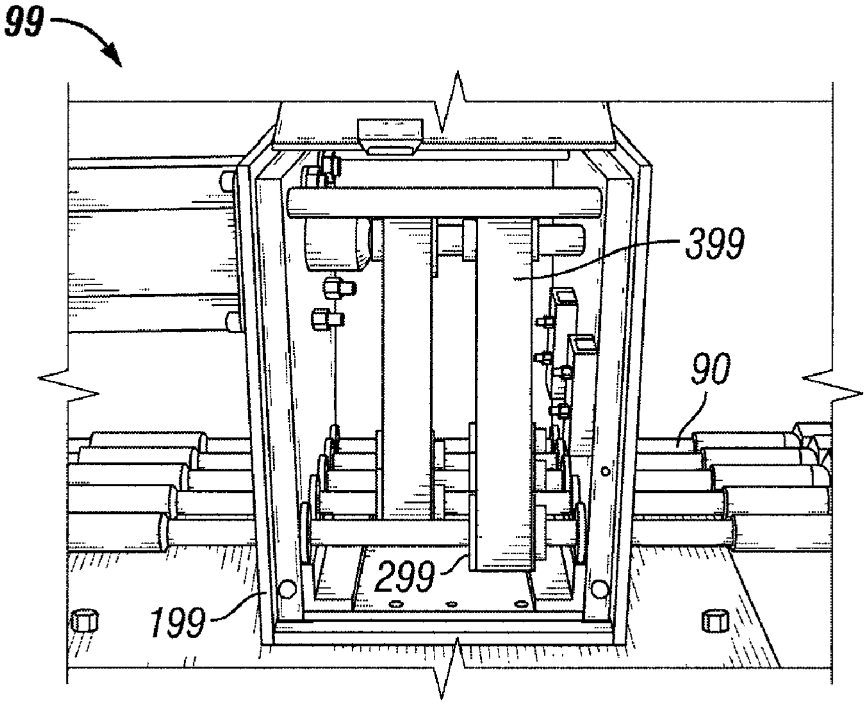
Figure 36:
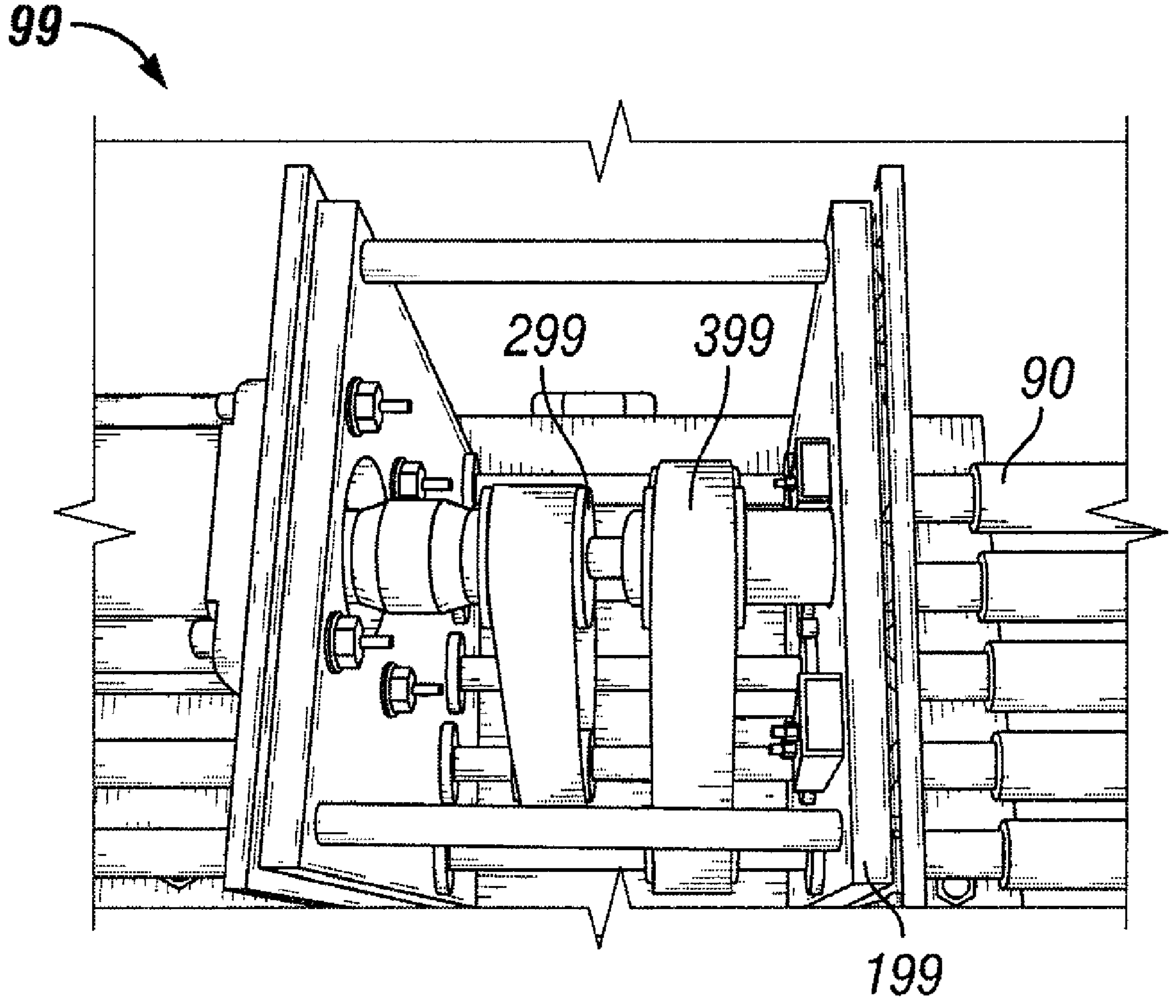

In an illustrative embodiment as shown in FIGS. 34-36, one or more components of assembly 10 may be capable of providing rotational motion for one or more lances 90. For example, assembly 10 may include an apparatus for cleaning tubes on a tube sheet that includes at least one tube cleaning lance 90, tube cleaning lance positioning device 91 for manipulating the motion of tube cleaning lance 90 with regard to one or more of the x, y and z planes, and a tube cleaning lance rotating device 99 for manipulating the rotational motion of tube cleaning lance 90. Control console 20 can providing instructions to tube cleaning lance positioning device 91 and/or tube cleaning lance rotating device 99. In an illustrative embodiment, assembly 10 can utilize one or more rotating lances 90 having non-rotating nozzles 96 to provide full coverage for the tube 88 being cleaned. In an illustrative embodiment, nozzle 96 does not rotate independently of rotating lance 90. Rotating nozzles 96 can also be utilized, in another illustrative embodiment.

In an illustrative embodiment, assembly 10 may have a gearbox 199 or other carriage system that can house a plurality of lances 90 on equal centers from lance to lance allowing for rotation of all lances 90 from 0-3000 RPMs. Lances 90 may also be placed in a staggered pattern in gearbox 199 when, for example, tighter patterns are needed. In an illustrative embodiment, all lances 90 can be rotated using a series of pulleys 299 driven by a single belt 399 located within gearbox 199. Alternatively, a series of gears can be utilized to rotate lances 90, or a plurality of belts 399 or motors such as direct drive motors may be utilized, within the present illustrative embodiments.

In an illustrative embodiment, assembly 10 can be utilized to clean a variety of different types of exchangers 12, as well as a variety of types of pipes used in industrial equipment. For example, in certain illustrative embodiments, assembly 10 can be lifted by a crane or other similar lifting device and disassembled and reassembled in the field in order to access exchangers in hard to reach locations. Assembly 12 can be used to clean tubes 88 in a vertically oriented exchanger 12 or otherwise in any vertical orientation, whereby, for example, assembly 10 can be positioned at or near the top end of exchanger 12 such that lances 90 are aligned with tubes 88. Assembly 10 can also be used to clean, for example, fin fan exchangers or the shell side of a shell and tube exchanger. In an illustrative embodiment, assembly 10 and motion control computer 120 can be used to control the cleaning of an outside diameter of a tube bundle. A spray head system can be incorporated with assembly 10 that moves along the shell side of one or more bundles to clean the exterior of the bundles. Assembly 10 can also include a variable speed conveyer 650 (not shown). Items to be cleaned such as industrial piping, scaffolding, column trays or exchanger equipment can be placed on the conveyer 650, and cleaning lance 90 or another cleaning instrument on assembly 10 can be used to clean these pieces of equipment as the equipment is moved by conveyer device 650.

It is to be understood that the invention is not limited to the exact details of construction, operation, exact materials, or illustrative embodiments shown and described, as modifications and equivalents will be apparent to one skilled in the art. For example, complete automation of assembly 10 is also possible, if desired, through CNC technology. In other words, assembly 10 may operate automatically without the need for a human operator, or alternatively, the assembly 10 may be controlled by a human operator. Also, multiple digital scans of the exchanger tube sheet may be performed at any time during the cleaning process, if necessary. Accordingly, the invention is therefore to be limited only by the scope of the appended claims.

What is claimed is:

1. An automated system for cleaning one or more tubes in a heat exchanger, comprising: a surface scanning device for capturing three dimensional coordinates corresponding to the location of the tubes in the heat exchanger to be cleaned; a heat exchanger tube cleaning lance; a heat exchanger tube cleaning lance positioning device; and a motion control computer for controlling the motion of the heat exchanger tube cleaning lance positioning device relative to the tubes in the heat exchanger based upon the three dimensional coordinates captured by the surface scanning device.

2. The system of claim 1, further comprising a command console in operational connection with the motion control computer for controlling the motion of the heat exchanger tube cleaning lance positioning device.

3. The system of claim 2, wherein the motion control computer is communicatively coupled to a remote monitoring device via a communications network.

4. The system of claim 2, wherein the location of the command console is a remote distance from the location of the heat exchanger tube cleaning lance positioning device.

5. The system of claim 1, further comprising a pumping station operationally controlled by the motion control computer for supplying cleaning materials to the heat exchanger tube cleaning lance.

6. The system of claim 5, where the cleaning materials are selected from the group consisting of water and cleaning solutions.

7. The system of claim 1, wherein the respective movements of the heat exchanger tube cleaning lance and the surface scanning device are independent.

8. The system of claim 1, wherein the surface scanning device is a sensor.

9. The system of claim 8, wherein the sensor is a laser.

10. An automated system for cleaning one or more tubes on a tube sheet of a heat exchanger, the system comprising: a display for presenting a map of at least a portion of the tube sheet; a user input device for defining a cleaning region on the map and for identifying at least one tube within the cleaning region; a tube cleaning lance for accessing one or more tubes on the tube sheet; a tube cleaning lance positioning device for maneuvering the tube cleaning lance; and a motion control computer for navigating the motion of one or more of the tube cleaning lance and the tube cleaning lance positioning device with respect to the tubes on the tube sheet by utilizing information received from the user input device.

11. The system of claim 10, wherein the user input device is one or more of a touch screen, a joystick controller, a mouse and a trackball.

12. The system of claim 10, further comprising a plurality of tube cleaning lances for accessing a plurality of tubes on the tube sheet.

13. The system of claim 12, wherein the plurality of tube cleaning lances are disposed within a bracelet.

14. The system of claim 12, wherein the plurality of tube cleaning lances access the plurality of tubes on the tube sheet simultaneously.

15. The system of claim 10, wherein the motion control computer is communicatively coupled to a remote monitoring device via a communications network.

16. The system of claim 10, wherein the location of the motion control computer is a remote distance from the location of the tube cleaning lance positioning device.

17. The system of claim 10, further comprising a pumping station operationally controlled by the motion control computer for supplying cleaning materials to the tube cleaning lance.

18. An automated apparatus for cleaning one or more tubes on a tube sheet of a heat exchanger, the apparatus comprising: at least one tube cleaning lance; a tube cleaning lance positioning device for manipulating the motion of the at least one tube cleaning lance with regard to one or more of the x, y and z planes; a surface scanning device for capturing three dimensional coordinates corresponding to the location of the tubes in the heat exchanger to be cleaned; and a tube cleaning lance rotating device for manipulating the rotational motion of the at least one tube cleaning lance.

19. The apparatus of claim 18, further comprising a control console for providing instructions to at least one of the tube cleaning lance positioning device and the tube cleaning lance rotating device.

20. The apparatus of claim 18, wherein the at least one tube cleaning lance comprises five or more tube cleaning lances.

21. The apparatus of claim 18, further comprising a nozzle disposed on the tube cleaning lance, whereby the nozzle does not rotate independently of the tube cleaning lance.

* * * * *